(12) United States Patent
Guo

(10) Patent No.: US 12,363,583 B2
(45) Date of Patent: Jul. 15, 2025

(54) PARAMETER CONFIGURATION METHOD, APPARATUS AND SYSTEM, DEVICE AND STORAGE MEDIUM

(71) Applicant: GUANGDONG OPPO MOBILE TELECOMMUNICATIONS CORP., LTD., Dongguan (CN)

(72) Inventor: Yali Guo, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 371 days.

(21) Appl. No.: 17/946,364

(22) Filed: Sep. 16, 2022

(65) Prior Publication Data

US 2023/0018378 A1  Jan. 19, 2023

Related U.S. Application Data

(63) Continuation of application No. PCT/CN2020/126536, filed on Nov. 4, 2020.

(51) Int. Cl.
*H04W 28/02* (2009.01)
*H04M 15/00* (2006.01)
*H04W 88/04* (2009.01)

(52) U.S. Cl.
CPC ....... *H04W 28/0268* (2013.01); *H04M 15/66* (2013.01); *H04W 88/04* (2013.01)

(58) Field of Classification Search
CPC . H04W 28/0268; H04W 88/04; H04W 28/24; H04M 15/66
See application file for complete search history.

(56) References Cited

U.S. PATENT DOCUMENTS

| 11,277,745 B2* | 3/2022 | Yang | H04W 12/10 |
| 11,924,893 B2* | 3/2024 | Guo | H04W 76/14 |
| 2019/0230572 A1* | 7/2019 | Cheng | H04W 40/12 |
| 2020/0145884 A1 | 5/2020 | Guo | |
| 2021/0084542 A1* | 3/2021 | Ahmad | H04W 4/06 |

(Continued)

FOREIGN PATENT DOCUMENTS

| CN | 109151913 A | 1/2019 |
| CN | 109548088 A | 3/2019 |

(Continued)

OTHER PUBLICATIONS

Futurewei, "QoS Control with Sidelink Relay", 3GPP TSG-RAN WG2 Meeting #111e, R2-2006724, Electronic Meeting, Aug. 17-28, 2020.

(Continued)

*Primary Examiner* — Abdullahi Ahmed
(74) *Attorney, Agent, or Firm* — BAYES PLLC

(57) ABSTRACT

The present application relates to the technical field of communications, and provides a parameter configuration method, apparatus and system, a device and a storage medium. The method comprises: a core network sends parameter configuration information to a relay terminal device, wherein the parameter configuration information is used for configuring QoS parameters between the relay terminal device and a remote terminal device in the case of starting a reflective QoS mechanism. The present application ensures the quality of service transmission between the relay terminal device and the remote terminal device.

14 Claims, 12 Drawing Sheets

(56) References Cited

U.S. PATENT DOCUMENTS

| | | | | |
|---|---|---|---|---|
| 2022/0124549 A1* | 4/2022 | Yang | ................. | H04W 28/0268 |
| 2022/0240122 A1* | 7/2022 | Liu | ..................... | H04B 17/309 |
| 2024/0015818 A1* | 1/2024 | Kuo | ..................... | H04W 76/14 |

FOREIGN PATENT DOCUMENTS

| | | |
|---|---|---|
| CN | 110169097 A | 8/2019 |
| CN | 110505653 A | 11/2019 |

OTHER PUBLICATIONS

International Search Report issued in International application No. PCT/CN2020/126536, mailed Jul. 26, 2021.

Written Opinion of the International Searching Authority issued in International application No. PCT/CN2020/126536, mailed Jul. 26, 2021.

3GPP TR 23.752 V0.5.1 (Oct. 2020); Technical Specification Group Services and System Aspects; Study on system enhancement for Proximity based Services; (ProSe) in the 5G System (5GS) (Release 17).

3GPP TS 24.501 V17.0.0 (Sep. 2020); Technical Specification Group Core Network and Terminals; Non-Access-Stratum (NAS) protocol for 5G System (5GS); Stage 3 (Release 17).

First Office Action issued in corresponding European application No. 20960268.9, mailed Dec. 21, 2023.

Title: Corrections on Reflective QoS; Source to WG: Ericsson 3GPP TSG-CT WG3 Meeting #101 C3-190214 Montreal, Canada, Feb. 25-Mar. 1, 2019.

3GPP TS 23.501 V16.0.0 (Mar. 2019) Technical Specification Group Services and System Aspects; System Architecture for the 5G System; Stage 2 (Release 16).

Oppo, "KI#3: Update to Sol #6, 24, 25 to address ENs", S2-2008283, SA WG2 Meeting #141E Oct. 12-Oct. 23, 2020, Elbonia.

Extended European Search Report issued in corresponding European application No. 20960268.9, mailed Mar. 29, 2023.

Priority Review issued in corresponding Chinese application No. 202211574112.9, mailed Apr. 25, 2024.

First Office Action issued in corresponding Chinese application No. 202211574112.9, mailed May 15, 2024.

Second Office Action issued in corresponding European application No. 20960268.9, mailed Jun. 25, 2024.

Second Examination Opinion Notice issued in corresponding Chinese Application No. 202211574112.9, mailed on Aug. 31, 2024, 12 pages.

\* cited by examiner

PARAMETER CONFIGURATION METHOD, APPARATUS AND SYSTEM, DEVICE AND STORAGE MEDIUM

CROSS-REFERENCE TO RELATED APPLICATION

The present application is a continuation of International Application No. PCT/CN2020/126536 filed on Nov. 4, 2020, the entire disclosure of which is incorporated herein by reference in its entirety.

TECHNICAL FIELD

Embodiments of the present application relate to the technical field of communications, and particularly, to a parameter configuration method, apparatus and system, a device and a storage medium.

BACKGROUND

The 3rd Generation Partnership Project (3GPP) introduced the concept of relay communication in the Release 13 (R13) Proximity Service (ProSe) architecture.

The relay communication refers to User Equipment (UE)-to-Network relay based on an Internet Protocol (IP) layer, where the User Equipment is connected to a network. That is, a Remote User Equipment (Remote UE) accesses the network through a Relay User Equipment (Relay UE). The Relay UE undertakes the relay function of the IP layer, and transmits data between the Remote UE and the network, so as to establish a communication connection between the Remote UE and the network. In order to ensure the quality of service transmission, a Quality of Service (QoS) architecture is introduced in related art to support different services corresponding to different QoS requirements. For a non-relay communication, the terminal device directly establishes a connection with the network, and the network may regulate the transmission of different services between the terminal device and the network according to different QoS parameters. However, for a relay communication, the network may regulate the transmission of different services between the relay terminal device directly connected to the network and the network according to different QoS parameters, but the network is unable to regulate the transmission of different services between the Remote UE and the Relay UE. Thus, the quality of service transmission between the Remote UE and the Relay UE cannot be ensured.

Therefore, for a relay communication, it is necessary to further discuss and research how to configure the QoS parameters between Remote UE and Relay UE.

SUMMARY

Embodiments of the present application provide a parameter configuration method, apparatus and system, a device and a storage medium. The technical solution is described as follows.

In one aspect, embodiments of the present application provide a parameter configuration method, applied to a relay terminal device. The method includes: receiving parameter configuration information from a core network, where the parameter configuration information is used for configuring QoS parameters between the relay terminal device and a remote terminal device when a reflective QoS mechanism is enabled.

In another aspect, embodiments of the present application provide a parameter configuration method, applied to a core network. The method includes: sending parameter configuration information to a relay terminal device, where the parameter configuration information is used for configuring QoS parameters between the relay terminal device and a remote terminal device when a reflective QoS mechanism is enabled.

In still another aspect, embodiments of the present application provide a parameter configuration apparatus, arranged in a relay terminal device. The apparatus includes: a configuration information receiving module, configured to receive parameter configuration information from a core network, where the parameter configuration information is used for configuring QoS parameters between the relay terminal device and a remote terminal device when a reflective QoS mechanism is enabled.

In still another aspect, embodiments of the present application provide a parameter configuration system. The parameter configuration system is configured to: send parameter configuration information to a relay terminal device, where the parameter configuration information is used for configuring QoS parameters between the relay terminal device and a remote terminal device when a reflective QoS mechanism is enabled.

In still another aspect, embodiments of the present application provide a relay terminal device. The relay terminal device includes a processor, and a transceiver connected to the processor. The transceiver is configured to receive parameter configuration information from a core network. The parameter configuration information is used for configuring QoS parameters between the relay terminal device and a remote terminal device when a reflective QoS mechanism is enabled.

In still another aspect, embodiments of the present application provide a core network device. The core network device includes a processor, and a transceiver connected to the processor. The transceiver is configured to send parameter configuration information to a relay terminal device. The parameter configuration information is used for configuring QoS parameters between the relay terminal device and a remote terminal device when a reflective QoS mechanism is enabled.

In still another aspect, embodiments of the present application provide a computer-readable storage medium, where a computer program is stored in the storage medium, and the computer program is configured to be executed by a processor of a relay terminal device to implement the aforementioned parameter configuration method at the relay terminal device side.

In still another aspect, embodiments of the present application provide a computer-readable storage medium, where a computer program is stored in the storage medium, and the computer program is configured to be executed by a processor of a core network device to implement the aforementioned parameter configuration method at the core network device side.

In still another aspect, embodiments of the present application provide a chip, where the chip includes a programmable logic circuit and/or program instructions, and the chip is configured to implement the aforementioned parameter configuration method at the relay terminal device side when the chip runs on the relay terminal device.

In still another aspect, embodiments of the present application provide a chip, where the chip includes a programmable logic circuit and/or program instructions, and the chip is configured to implement the aforementioned parameter configuration method at the core network device side when the chip runs on the core network device.

In still another aspect, embodiments of the present application provide a computer program product, which is configured to implement the aforementioned parameter configuration method at the relay terminal device side when the computer program product runs on the relay terminal device.

In still another aspect, embodiments of the present application provide a computer program product, which is configured to implement the aforementioned parameter configuration method at the core network device side when the computer program product runs on the core network device.

The technical solutions provided by embodiments of the present disclosure may include the following beneficial effects.

When the core network determines to enable the reflective QoS mechanism, the parameter configuration information is sent from the core network to the relay terminal device for configuring QoS parameters between the relay terminal device and the remote terminal device. Thus, the defect can be solved that the relay terminal device cannot obtain the QoS parameters in the relay communication system when the core network enables the reflective QoS mechanism, and the quality of service transmission between the relay terminal device and the remote terminal device can be ensured. In addition, in embodiments of the present application, it is not limited which functional entity in the core network sends the parameter configuration information to the relay terminal device. Thus, in an actual application process, the sending entity of the parameter configuration information can be flexibly set according to the known information interaction architecture. On the one hand, this matches the known information interaction architecture, and improves the compatibility and efficiency of parameter configuration. On the other hand, this improves the flexibility of parameter configuration.

BRIEF DESCRIPTION OF THE DRAWINGS

In order to illustrate the technical solutions in embodiments of the present disclosure more clearly, the drawings which are used in the description of embodiments are introduced briefly in the following. Obviously, the drawings in the following description are only some embodiments of the present disclosure. For those of ordinary skill in the art, other drawings can also be obtained from these drawings without paying creative effort.

DETAILED DESCRIPTION

In order to make the objectives, technical solutions and advantages of the present disclosure clearer, embodiments of the present disclosure will be further described in detail below with reference to the accompanying drawings.

The network architecture and service scenarios described in embodiments of the present disclosure are used for the purpose of illustrating the technical solutions of embodiments of the present disclosure more clearly, and do not constitute any limitation on the technical solutions provided by embodiments of the present disclosure. It is known to those skilled in the art that the technical solutions provided by embodiments of the present disclosure are also applicable to similar technical problems with the evolution of the network architecture and the emergence of new service scenarios.

The technical solutions provided in embodiments of the present disclosure may be applied to various communication systems, such as: Global System of Mobile Communication (GSM) system, Code Division Multiple Access (CDMA) system, Wideband Code Division Multiple Access (WCDMA) system, General Packet Radio Service (GPRS) system, Long Term Evolution (LTE) system, Frequency Division Duplex (FDD) system, Time Division Duplex (TDD) system, Universal Mobile Telecommunication System (UMTS), Worldwide Interoperability for Microwave Access (WiMAX) communication system, 5th-Generation System (5GS) or New Radio (NR) system, or other subsequent evolution systems, etc.

Figure 1:
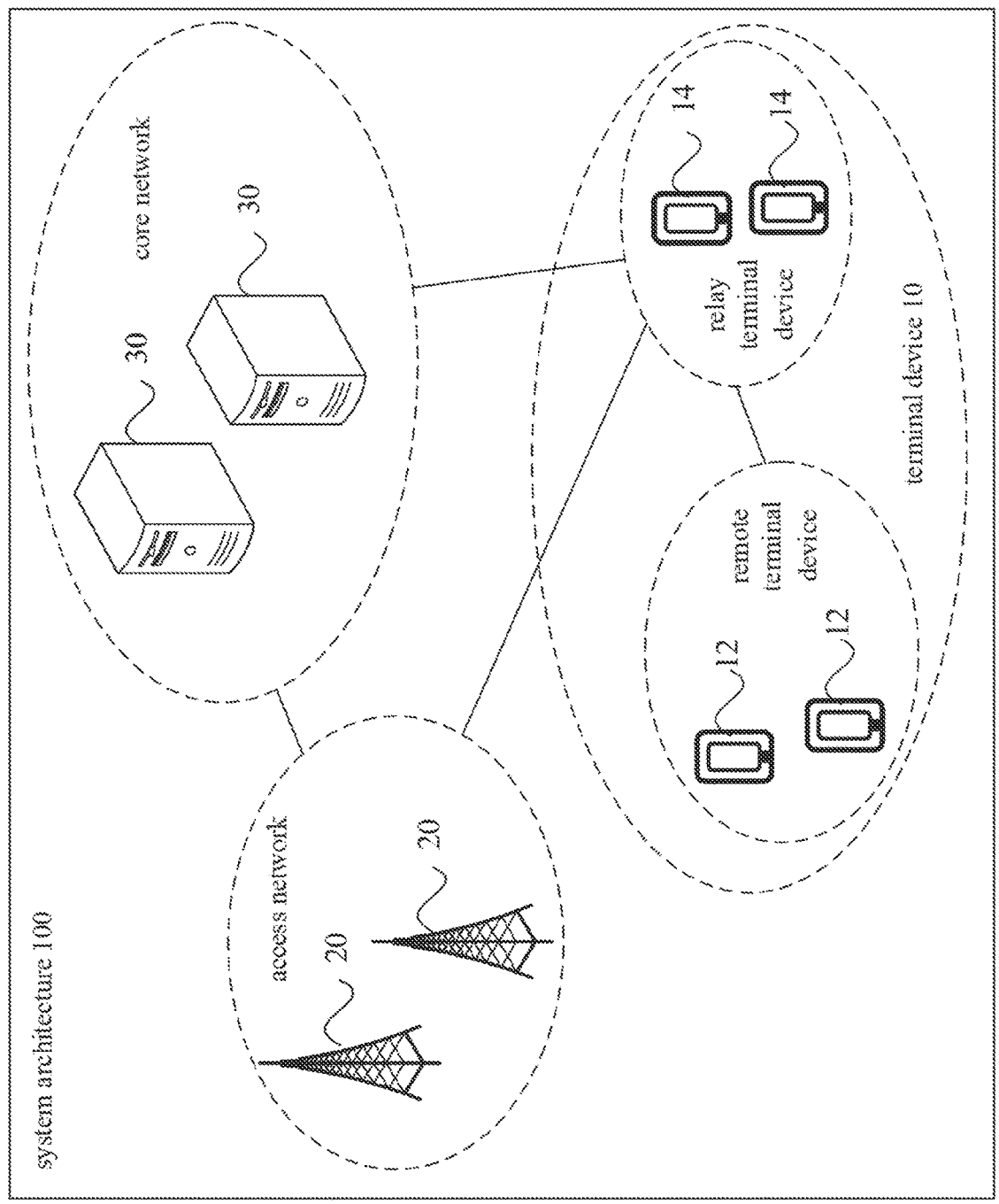
FIG. 1 is a schematic diagram of a communication system provided by an embodiment of the present disclosure.

Reference is made to FIG. 1, which illustrates a schematic diagram of a system architecture of a communication system provided by an embodiment of the present disclosure. As shown in FIG. 1, the system architecture 100 may include a terminal device 10, an access network device 20 and a core network device 30.

The terminal device 10 may refer to a UE, an access terminal, a subscriber unit, a subscriber station, a mobile station, a mobile, a remote station, a remote terminal, a mobile device, a wireless communication device, a user agent, or a user equipment. Optionally, the terminal device may also be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to a wireless modem, an in-vehicle device, a wearable device, a terminal device in 5GS or a terminal device in Public Land Mobile Network (PLMN) of future evolution, etc., which are not limited by embodiments of the present disclosure.

The access network device 20 is a device deployed in an access network to provide wireless communication functions for the terminal device(s). The access network device 20 may include various forms of macro base stations, micro base stations, relay stations, access points, etc. The name of the device with functions of the access network device may vary in systems using different wireless access technologies, for example, gNodeB or gNB in 5GS. As communication technology evolves, the name "access network device" may change. For the sake of description, in embodiments of the present disclosure, the above-mentioned apparatuses used for providing wireless communication functions for the terminal device(s) are collectively referred to as access network devices.

The core network device 30 refers to a device that can provide a terminal device with functions such as session management, mobility relationship, policy management, security authentication, etc. In embodiments of the present disclosure, the core network device 30 may include a first core network device, a second core network device, and a third core network device, where the first core network device is in charge of the session management of the terminal device; the second core network device is in charge of forwarding the user data packet according to the routing rules of the first core network device; and the third core network device is in charge of user policy management. Exemplarily, in the 5GS system, the first core network may be implemented as an Session Management Function (SMF), the second core network device may be implemented as a User Plane Function (UPF), and the third core network device may be implemented as a Policy Control Function (PCF).

In an example, as shown in FIG. 1, the terminal devices include a remote terminal device 12 and a relay terminal device 14. The relay terminal device 14 may perform data transmission with the remote terminal device 12 to establish a communication connection between the remote terminal device 12 and a network device. The network device includes the access network device 20 and/or the core network device 30.

Figure 2:
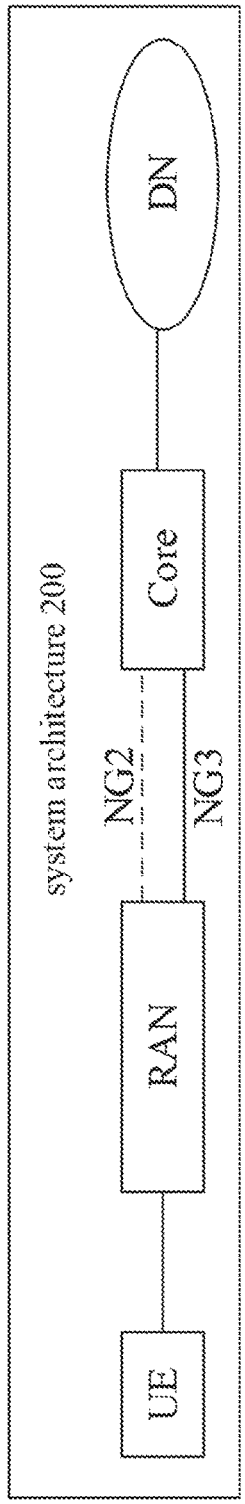
FIG. 2 is a schematic diagram of a 5GS system architecture provided by an embodiment of the present disclosure.

FIG. 2 illustrates a schematic diagram of a system architecture in 5GS provided by an embodiment of the present disclosure. As shown in FIG. 2, the system architecture 200 may include a UE, a (Radio) Access Network ((R)AN), a Core network, and a Data Network (DN). The UE, AN and Core network are the main components of the architecture. Logically, they may be divided into two parts: the user plane, which is responsible for management of the mobile network, and the control plane, which is responsible for transmission of service data. In FIG. 2, the NG2 reference point is located between the RAN control plane and the Core network control plane, the NG3 reference point is located between the RAN user plane and the Core network user plane, and the NG6 reference point is located between the Core network user plane and the data network.

The UE is the portal for mobile users to interact with the network. The UE may provide basic computing capabilities and storage capabilities, display service windows to users, and accept inputs of user operation. The UE may use next-generation radio technology to establish a signal connection and a data connection with the RAN, so as to transmit control signals and service data to the mobile network.

The (R)AN is similar to the base station in the traditional network. The (R)AN is deployed at a position close to the UE so as to provide network access functions for authorized users in a specific area. The (R)AN may transmit user data by using transmission channels of different quality according to the user level and service requirements, etc. The RAN can manage its own resources, use the resources rationally, provide access services to the UE on demand, and forward control signals and user data between the UE and the core network.

The Core network is responsible for maintaining the subscription data of the mobile network, managing the network elements of the mobile network, and providing functions such as session management, mobility management, policy management, and security authentication for the UE. When the UE is attached, the Core network provides network access authentication for the UE. When the UE has a service request, the Core network allocates network resources for the UE. When the UE is mobile, the Core network updates the network resources for the UE. When the UE is idle, the Core network provides a fast recovery mechanism for the UE. When the UE is detached, the Core network releases network resources for the UE. When the UE has service data, the Core network provides data routing functions for the UE, such as forwarding uplink data to the DN, or receiving downlink data of the UE from the DN, forwarding to the RAN, and then sending to the UE.

The DN is a data network that provides business services for users. Generally, the client is located at the UE, and the server is located at the data network. The data network may be a private network, such as a local area network, or an external network that is not controlled by operators, such as the Internet. Alternatively, the data network may be a proprietary network jointly deployed by operators, such as for configuration of IP Multimedia Core Network Subsystem (IMS) services.

Figure 3:
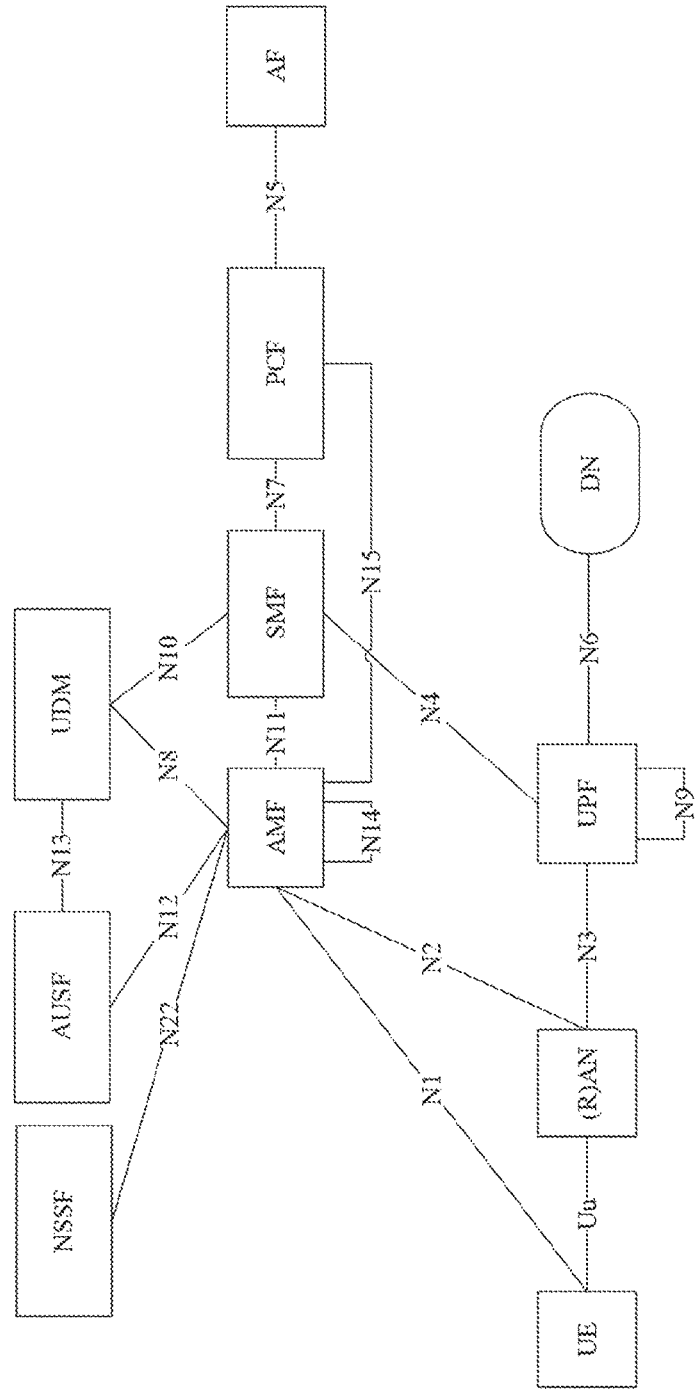
FIG. 3 is a schematic diagram of a 5GS system architecture provided by another embodiment of the present disclosure.

FIG. 3 is a detailed architecture determined on the basis of FIG. 2, in which the core network user plane includes UPF; the core network control plane includes Authentication Server Function (AUSF), Core Access and Mobility Management Function (AMF), SMF, Unified Data Management (UDM), PCF, Application Function (AF). The functions of these functional entities are described as follows.

UPF refers to forwarding of user data packet according to the routing rules of SMF.

AUSF refers to performing security authentication of UE.

AMF refers to Access Management and Mobility Management of UE.

SMF refers to Session Management of UE.

UDM refers to user subscription context management.

PCF refers to User Policy Management.

AF refers to User Application Management.

In the architecture shown in FIG. 3, the Uu interface is the reference point between the UE and the AN, which is used for access layer message interaction and wireless data transmission; the N1 interface is the reference point between the UE and the AMF; the N2 interface is the reference point between the RAN and the AMF, which is used for sending NAS messages, etc.; the N3 interface is the reference point between the RAN and the UPF, which is used for transmitting data of the user plane, etc.; the N4 interface is the reference point between the SMF and the UPF, which is used for transmitting information such as channel identification information of the N3 connection, data buffer indication information, and downlink data notification message; and the N6 interface is the reference point between the UPF and the DN, which is used for transmitting data of the user plane, etc.

It should be specified that the names of the interfaces between the individual network elements in FIG. 2 and FIG. 3 are only given as examples, and the names of the interfaces in the specific implementations may be other names, which are not specifically limited by embodiments of the present disclosure. The name of each network element (such as SMF, AF, UPF, etc.) included in FIG. 2 and FIG. 3 is also only given as example, and do not constitute any limitation on the functions of the network elements themselves. In the 5GS and other future networks, the above-mentioned network elements may also have other names, which are not specifically limited by embodiments of the present disclosure. For example, in a 6G network, some or all of the above-mentioned network elements may continue to use the terminology in 5G, or may also use other names, etc., which will not be repeated hereinafter. Furthermore, it should be understood that the names of the messages (or signaling) transmitted between the above-mentioned network elements are also only given as examples and do not constitute any limitation on the functions of the messages themselves.

After the terminal device accesses the network, the SMF located in the core network sends QoS rules to the terminal device through control signaling. The terminal device uses the QoS rules to match the uplink service data, and maps the uplink service data to the appropriate QoS flow for QoS control. Considering the support for a variety of new services in the 5G network, the QoS parameters configured to the terminal device may be complex in structure and frequently updated. For this reason, an optional reflective QoS mechanism is introduced into the 5G network. The main idea of the reflective QoS mechanism is to add the QoS flow identifier QFI and the reflective indication to the header of the downlink data packet. The terminal device determines the QoS rules by itself according to the received downlink data packet, and applies the QoS rules to the uplink data transmission, thereby reducing the signaling interaction between the SMF and the terminal device.

Figure 4:
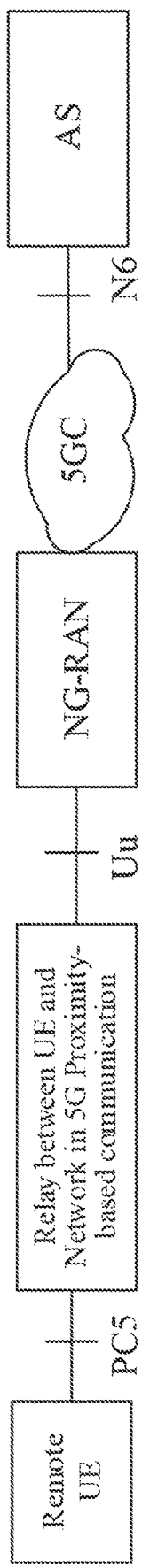
FIG. 4 is a schematic diagram of a relay communication system provided by an embodiment of the present disclosure.

In embodiments of the present disclosure, when a terminal device has both the ability for connecting to an external data network through a network such as 5G, and the capability for Proximity-based Services (ProSe), the terminal device may be selected as a relay terminal device, and another terminal device with ProSe capability may be selected as a remote terminal device. The terminal device with ProSe capability may communicate directly with another terminal device with ProSe capability through a PC5 interface. As shown in FIG. 4, the remote terminal device may establish a direct connection with the relay terminal device through the PC5 interface, and interact with the external network through the PDU session established between the relay terminal device and the network.

In an example, the core network sends QoS parameters (also referred to as PC5 QoS parameters) between the relay terminal device and the remote terminal device to the relay terminal device through a control plane message, or sends QoS parameters (also referred to as Uu QoS parameters) between the network device and the relay terminal device to the relay terminal device. The network device includes a core network device and/or an access network device. Therefore, when the relay terminal device receives the QoS parameters between the relay terminal device and the remote terminal device, the relay terminal device may directly use the QoS parameters to regulate the service transmission between the relay terminal device and the remote terminal device. When the relay terminal device receives the QoS parameters between the network device and the relay terminal device, the relay terminal device may further determine the QoS parameters between the relay terminal device and the remote terminal device according to the QoS parameters between the network device and the relay terminal device, and subsequently use the determined QoS parameters to regulate the service transmission between the remote terminal device and the relay terminal device.

However, for a relay communication, if the SMF in the core network enables the reflective QoS mechanism, the relay terminal device will no longer perform signaling interaction with the SMF. Thus, the relay terminal device cannot obtain the QoS parameters either. Therefore, even though the header of the downlink data packet sent by the UPF in the core network to the relay terminal device carries QFI, the relay terminal device cannot determine the QoS parameters corresponding to the QFI. Thus, the quality of service transmission between the remote terminal device and the relay terminal device cannot be ensured.

In view of above, embodiments of the present disclosure provide a parameter configuration method. The core network sends parameter configuration information to the relay terminal device, in a case that the core network determines to enable the reflective QoS mechanism. The parameter configuration information is used for configuring the QoS parameters between the relay terminal device and the remote terminal device. In embodiments of the present disclosure, the core network may either send the parameter configuration information to the relay terminal device through a control plane message, or send the parameter configuration information to the relay terminal device through a user plane message. Moreover, when different sending methods are used, the content of the parameter configuration information may also be different accordingly.

Hereinafter, the technical solutions of the present disclosure are introduced and illustrated through several embodiments.

Figure 5:
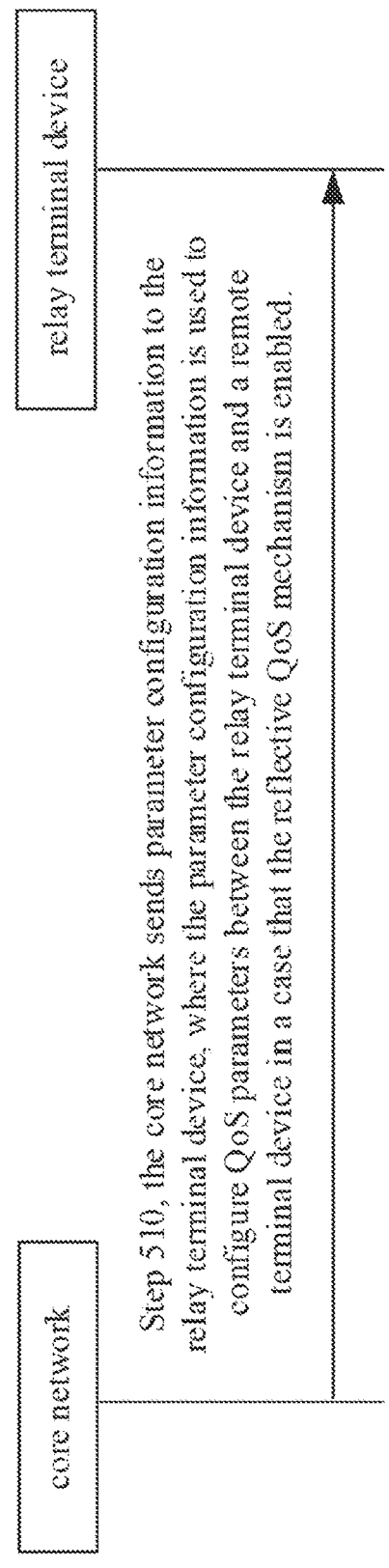
FIG. 5 is a flowchart of a parameter configuration method provided by an embodiment of the present disclosure.

Reference is made to FIG. 5, which illustrates a flowchart of a parameter configuration method provided in an embodiment of the present disclosure. The method may be applied to the communication system shown in FIG. 1 or FIG. 4 above. The method may include the following step.

In step 510, the core network sends parameter configuration information to the relay terminal device. The parameter configuration information is used for configuring QoS parameters between the relay terminal device and the remote terminal device when the reflective QoS mechanism is enabled.

The QoS parameters between the relay terminal device and the remote terminal device, which may also be referred to as PC5 QoS parameters, are used for ensuring the quality of service transmission between the relay terminal device and the remote terminal device. In embodiments of the present disclosure, the core network sends the parameter configuration information to the relay terminal device to configure the QoS parameters between the relay terminal device and the remote terminal device, when the core network determines that the reflective QoS mechanism needs to be enabled.

Embodiments of the present disclosure do not limit the timing and the mode in which the core network sends the parameter configuration information to the relay terminal device. In an example, the core network sends the parameter configuration information to the relay terminal device before determining to enable the reflective QoS mechanism and enabling the reflective QoS mechanism. Thus, the parameter configuration information is sent by the core network to the relay terminal device through a control plane message. That is, a control plane functional entity in the core network sends the parameter configuration information to the relay terminal device. In another example, the core network sends the parameter configuration information to the relay terminal device in the process of determining to enable the reflective QoS mechanism and enabling the reflective QoS mechanism, or after enabling the reflective QoS mechanism. Thus, the parameter configuration information is sent by the core network to the relay terminal device through a user plane message. That is, a user plane functional entity in the core network sends the parameter configuration information to the relay terminal device.

As can be seen from the above description, if the parameter configuration information is sent by the core network to the relay terminal device at different timings, the sending entities of the parameter configuration information are different. As an example, at a certain occasion, the sending entity of the parameter configuration information is consistent with the core network functional entity that interacts with the relay terminal device corresponding to such occasion in the existing information interaction architecture.

For example, in the existing information interaction architecture, the control plane functional entity in the core network interacts with the relay terminal device before the reflective QoS mechanism is enabled. Thus, the control plane functional entity is selected as the sending entity of the parameter configuration information before the reflective QoS mechanism is enabled. For another example, in the existing information interaction architecture, the user plane functional entity in the core network interacts with the relay terminal device in or after the process of enabling the reflective QoS mechanism. Thus, the user plane functional entity is selected as the sending entity of the parameter configuration information in or after the process of enabling the reflective QoS mechanism.

By setting, at different timings, the sending entity of the parameter configuration information consistent with the existing information interaction architecture, excessive and tedious modifications to the existing information interaction architecture can be avoided, and the compatibility of QoS parameter configuration is improved when the reflective QoS mechanism is enabled. In addition, the relay terminal device is also prevented from performing information interaction with too many different functional entities at the same time, so that the efficiency of QoS parameter configuration can be improved.

Optionally, the content of the parameter configuration information sent by different functional entities of the core network to the relay terminal device may be different. Exemplarily, the parameter configuration information sent by the control plane functional entity to the relay terminal device includes the QoS parameters, and the parameter configuration information sent by the user plane functional entity to the relay terminal device includes QFI. Despite the difference in the content of the parameter configuration information, in embodiments of the present disclosure, the relay terminal device may determine the QoS parameters between the relay terminal device and the remote terminal device according to the received parameter configuration information. For the content of the parameter configuration information, and the description of how the relay terminal device determines the QoS parameters, please refer to the following embodiments, and details are not repeated here.

In summary, the technical solution provided by embodiments of the present disclosure solves the defect that the relay terminal device of the relay communication system cannot obtain the QoS parameters when the core network enables the reflective QoS mechanism, and ensures the quality of service transmission between the relay terminal device and the remote terminal device. This is achieved by sending the parameter configuration information from the core network to the relay terminal device to configure the QoS parameters between the relay terminal device and the remote terminal device, when the core network determines to enable the reflective QoS mechanism. In addition, in embodiments of the present disclosure, it is not limited which functional entity in the core network sends the parameter configuration information to the relay terminal device. Thus, in a practical application process, the sending entity of the parameter configuration information can be flexibly set according to the known information interaction architectures. On the one hand, this matches the known information interaction architectures and improves the compatibility and efficiency of parameter configuration, and on the other hand, this improves the flexibility of parameter configuration.

In an example, the parameter configuration information includes a QFI bound to a PCC rule and the QoS parameters corresponding to the QFI.

Policy and Charging Control (PCC) rules are rules related to user policy management, where the PCC rules specify requirements related to QoS flows. It can be seen from the above description that during or after the process of enabling the reflective QoS mechanism, the relay terminal device determines the QoS parameters between the remote terminal device and the relay terminal device based on the QFI carried in the header of the downlink data packet and the reflective indication. Thus, the corresponding relationship between the QFI and the QoS parameters may be established, so that the relay terminal device may subsequently determine the corresponding QoS parameters based on the QFI carried in the header of the downlink data packet.

In view of above, the parameter configuration information sent by the core network to the relay terminal device includes the QFI bound to the PCC rule and the QoS parameters corresponding to the QFI. Optionally, the QoS parameters corresponding to the QFI include at least one of the following: the QoS parameters between the relay terminal device and the remote terminal device, and the QoS parameters between the relay terminal device and a network device. Embodiments of the present disclosure does not limit the type of the network device, and the network device may be an access network device, such as a base station, etc.; or a core network device, such as a UPF, etc.

Since the QoS parameters are configured by the control plane functional entity in the core network, when the parameter configuration information includes the QoS parameters, the control plane functional entity may send the parameter configuration information to the relay terminal device. Optionally, the core network includes a first core network device, and the first core network device provides control plane functions. That is, the first core network device is a control plane functional entity. For example, the first core network device is implemented as the SMF introduced in the above embodiments. Therefore, the parameter configuration information is carried in a control plane message that is exchanged between the first core network device and the relay terminal device.

Figure 6:
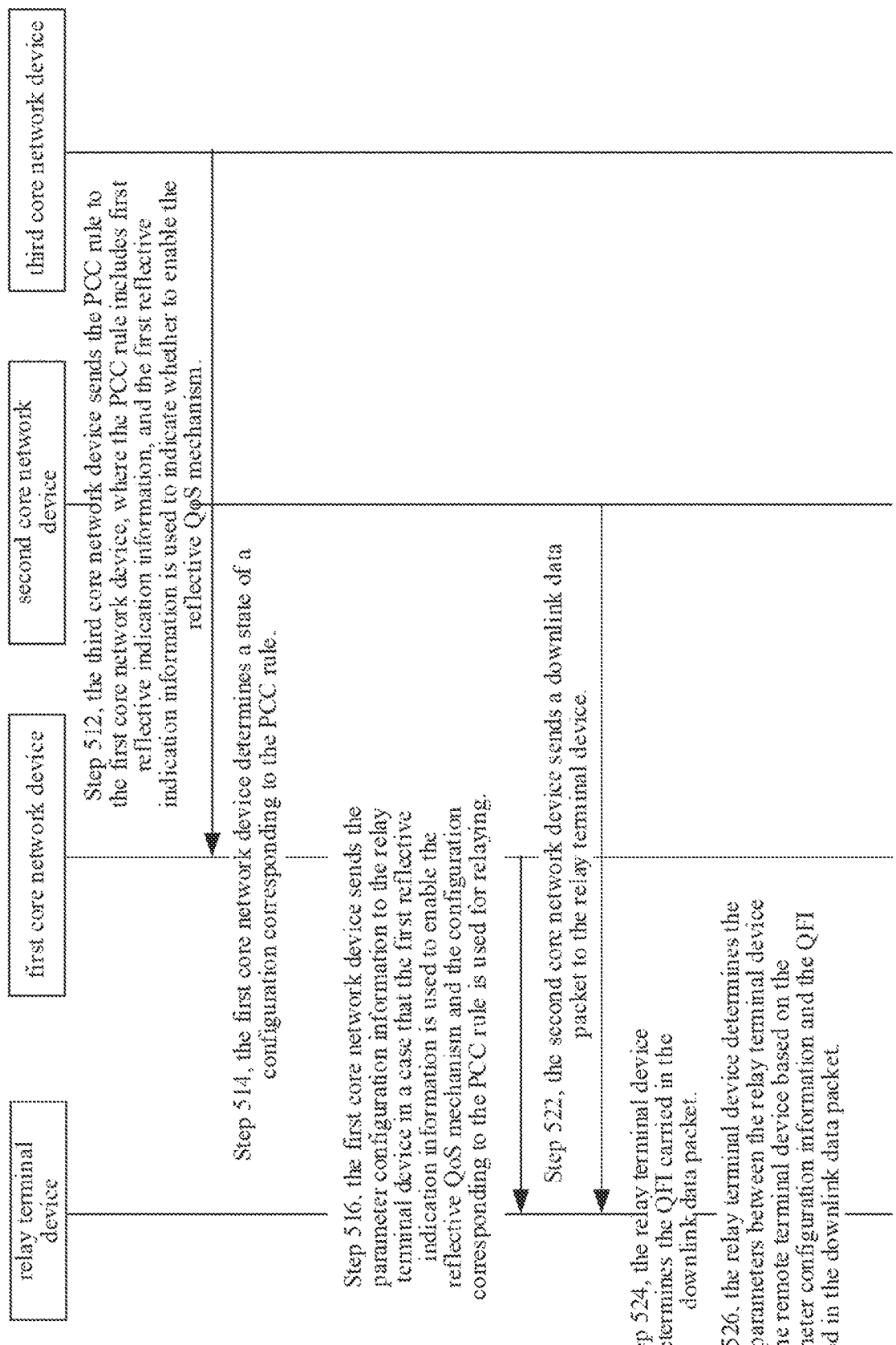
FIG. 6 is a flowchart of a parameter configuration method provided by another embodiment of the present disclosure.

In embodiments of the present disclosure, the QoS parameters in the parameter configuration information corresponds to the QFI bound to the PCC rule, so that the first core network device needs to determine the QFI bound to the PCC rule. In view of above, the above-mentioned core network further includes a third core network device, and the third core network device provides control plane functions. That is, the third core network device is also a control plane functional entity. For example, the third core network device is implemented as the PCF introduced in the above embodiments. As shown in FIG. 6, the above step 510 includes the following sub-steps.

In sub-step 512, the third core network device sends the PCC rule to the first core network device, where the PCC rule includes first reflective indication information, and the first reflective indication information is used to indicate whether to enable the reflective QoS mechanism.

The third core network device is used for user policy management, and thus, the PCC rule is generated by the third core network device. After generating the PCC rule, the third core network device may send the PCC rule to the first core network device. Optionally, the third core network device may also determine whether to enable the reflective QoS mechanism, and inform the first core network device of the determination result. In order to reduce the signaling interaction between the third core network device and the first core network device, the third core network device may carry the first reflective indication information in the PCC rule to indicate to the first core network device whether to enable the reflective QoS mechanism.

In sub-step 514, the first core network device determines a state of a configuration corresponding to the PCC rule.

The first core network device may determine the QoS flow bound to the PCC rule after receiving the PCC rule, and then determine the QoS flow identifier QFI as the QFI bound to the PCC rule. After that, the first core network device may configure the parameter configuration information according to the QFI bound to the PCC rule.

In addition, since the parameter configuration information is sent to the relay terminal device during the relay communication process in embodiments of the present disclosure, the first core network device also needs to determine whether the configuration corresponding to the PCC rule is used for relaying. If the configuration corresponding to the PCC rule is not used for relaying, the first core network device does not need to configure the parameter configuration information for the terminal device. Optionally, the configuration corresponding to the PCC rule includes at least one of the following: the terminal device corresponding to the PCC rule, the Protocol Data Unit (PDU) session corresponding to the PCC rule, and the Service Data Flow (SDF) corresponding to the PCC rule.

In sub-step 516, the first core network device sends the parameter configuration information to the relay terminal device when the first reflective indication information indicates to enable the reflective QoS mechanism and the configuration corresponding to the PCC rule is used for relaying.

The first core network device determines that the parameter configuration information needs to be configured for the relay terminal device, when the first reflective indication information indicates to enable the reflective QoS mechanism, and the configuration corresponding to the PCC rule is used for relaying. After determining the parameter configuration information according to the QFI bound to the PCC rule, the first core network device sends the parameter configuration information to the relay terminal device before enabling the reflective QoS mechanism.

During or after the process of enabling the reflective QoS mechanism, the control plane functional entity in the core network no longer performs signaling interaction with the relay terminal device, but the user plane functional entity in the core network performs signaling interaction with the relay terminal device. Therefore, in embodiments of the present disclosure, the core network further includes a second core network device, and the second core network device is configured to provide a user plane function. That is, the second core network device is a user plane function entity. For example, the second core network device is the UPF introduced in the above embodiments. In view of above, as shown in FIG. 6, the above method further includes the following steps.

In step 522, the second core network device sends a downlink data packet to the relay terminal device.

The second core network device may send the downlink data packet to the relay terminal device, where the downlink data packet carries QFI. Optionally, the QFI is carried in the header of the downlink data packet.

In step 524, the relay terminal device determines the QFI carried in the downlink data packet.

After receiving the downlink data packet, the relay terminal device may parse the downlink data packet to obtain the QFI carried in the downlink data packet.

In step 526, the relay terminal device determines the QoS parameters between the relay terminal device and the remote terminal device based on the parameter configuration information and the QFI carried in the downlink data packet.

On the one hand, the relay terminal device specifies the corresponding relationship between the QFI and the QoS parameters according to the parameter configuration information sent by the first core network device. On the other hand, the relay terminal device parses the QFI according to the downlink data packet sent by the second core network device. Thus, the relay terminal device may determine the QoS parameters corresponding to the QFI carried in the downlink data packet according to the corresponding relationship between the QFI and the QoS parameters, and then determine the QoS parameters between the relay terminal device and the remote terminal device.

As can be seen from the above description, in the parameter configuration information sent by the first core network device, the QoS parameters corresponding to QFI may be the QoS parameters between the relay terminal device and the remote terminal device, or the QoS parameters between the relay terminal device and the network device. In a case where the QoS parameters corresponding to QFI includes the QoS parameters between the relay terminal device and the remote terminal device, the relay terminal device directly determines the QoS parameters between the relay terminal device and the remote terminal device. That is, the above step 526 includes: the relay terminal device determining the QoS parameters corresponding to the QFI carried in the header of the downlink data packet as the QoS parameters between the relay terminal device and the remote terminal device. In a case where the QoS parameters corresponding to QFI includes the QoS parameters between the relay terminal device and the network device, the relay terminal device indirectly determines the QoS parameters between the relay terminal device and the remote terminal device. That is, the above step 526 includes: the relay terminal device determining the QoS parameters corresponding to the QFI carried in the header of the downlink data packet as the QoS parameters between the relay terminal device and the network device; and the relay terminal device determining the QoS parameters between the relay terminal device and the remote terminal device based on the QoS parameters between the relay terminal device and the network device.

To sum up, in the technical solutions provided by embodiments of the present disclosure, the control plane functional entity in the core network sends the parameter configuration information to the relay terminal device, before the core network enables the reflective QoS mechanism, where the parameter configuration information includes QFI and the QoS parameters corresponding to the QFI. Therefore, the relay terminal device may subsequently determine the QoS parameters between the remote terminal device and the relay terminal device based on the QFI carried in the received downlink data packet. Thus, the quality of service transmission between the relay terminal device and the remote terminal device may be effectively ensured.

In an example, the parameter configuration information includes the QFI bound to the PCC rule, where the QFI bound by the PCC rule is equal to a system QoS identifier.

The system QoS identifier is the most important part of the QoS parameters between the terminal device and the network device. In most cases, if the system QoS identifier is specified, the QoS parameters between the terminal device and the network device is also specified. In addition, for the relay communication, a corresponding relationship may be established between the QoS parameters between the relay terminal device and the network device, and the QoS parameters between the relay terminal device and the remote terminal device. Thus, if the relay terminal device knows the QoS parameters between the relay terminal device and the network device, the relay terminal device may further know the QoS parameters between the relay terminal device and the remote terminal device. Therefore, if the QFI bound to the PCC rule is equal to the system QoS identifier, then the relay terminal device knows the QFI bound to the PCC rule, and also knows the QoS parameters between the relay terminal device and the network device, and may further know the QoS parameters between the relay terminal device and the remote terminal device.

In view of above, the parameter configuration information sent by the core network to the relay terminal device includes the QFI bound to the PCC rule, when the QFI bound to the PCC rule is equal to the system QoS identifier. Optionally, the system QoS identifier includes 5G QoS Identifier (5QI).

The user plane message is exchanged between the core network and the relay terminal device after the reflective QoS mechanism is enabled, and the message carries QFI. In view of above, the core network includes a second core network device, and the second core network device is configured to provide a user plane function. That is, the second core network device is a user plane functional entity. For example, the second core network device is the UPF introduced in the above embodiments. Therefore, the parameter configuration information is carried in the user plane message that is exchanged between the second core network device and the relay terminal device. Optionally, the user plane message includes a downlink data packet, and the parameter configuration information is carried in a header of the downlink data packet.

In embodiments of the present disclosure, the QFI bound by the PCC rule is sent by a control plane functional entity of the core network to a user plane functional entity. In view of above, the core network further includes a first core network device and a third core network device. The first core network device and the third core network device provide control plane functions. That is, the first core network device and the third core network device are control plane functional entities. For example, the first core network device is the SMF introduced in the above embodiments, and the third core network device is the PCF introduced in the above embodiments.

In addition, in embodiments of the present disclosure, the first core network device may determine whether the reflective QoS mechanism needs to be enabled, or the third core network device may determine whether the reflective QoS mechanism needs to be enabled. In the following, the description is presented for each of these two cases.

Figure 7A:
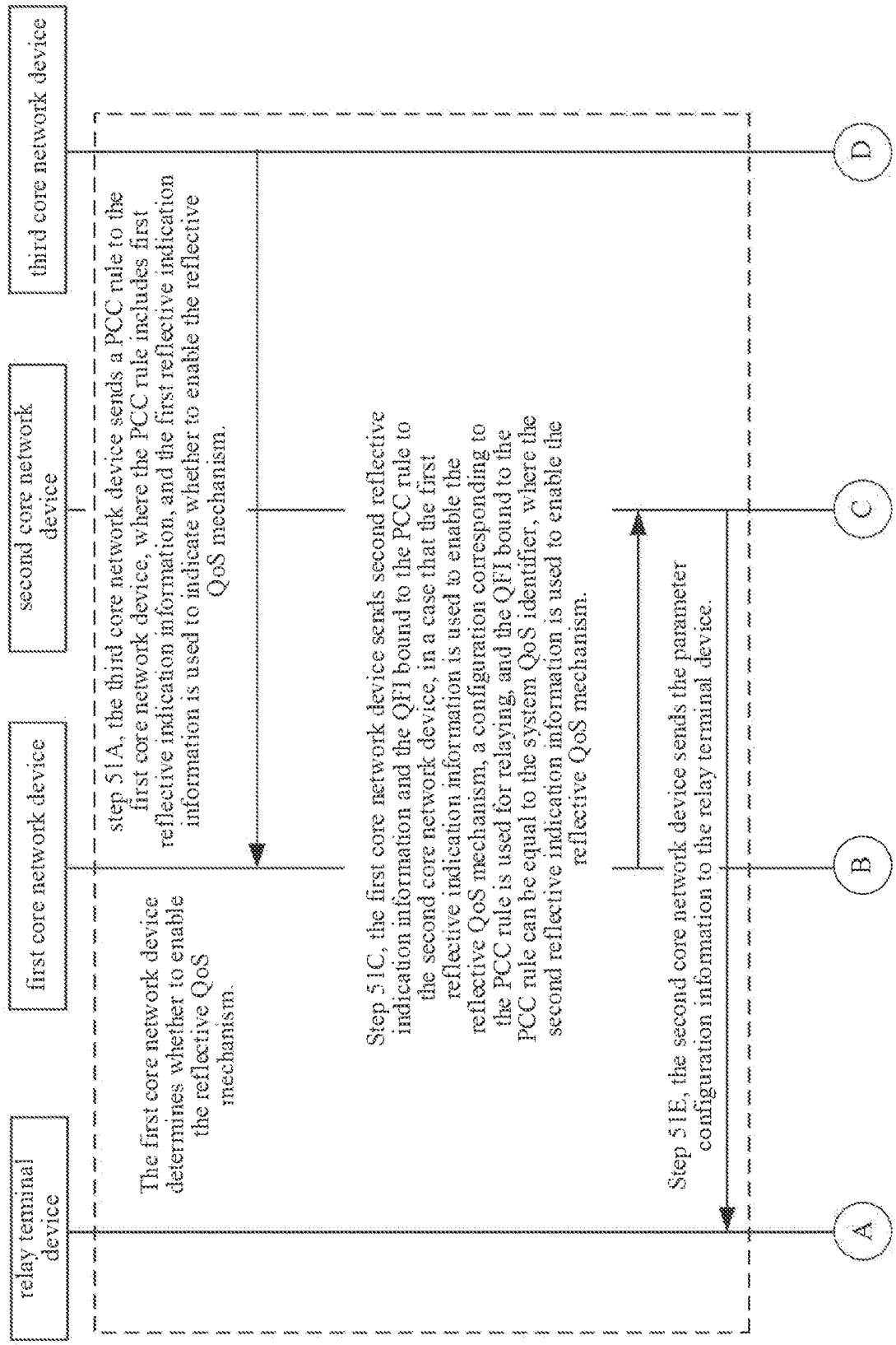
FIGS. 7A and 7B illustrate a flowchart of a parameter configuration method provided by still another embodiment of the present disclosure.
Figure 7B:
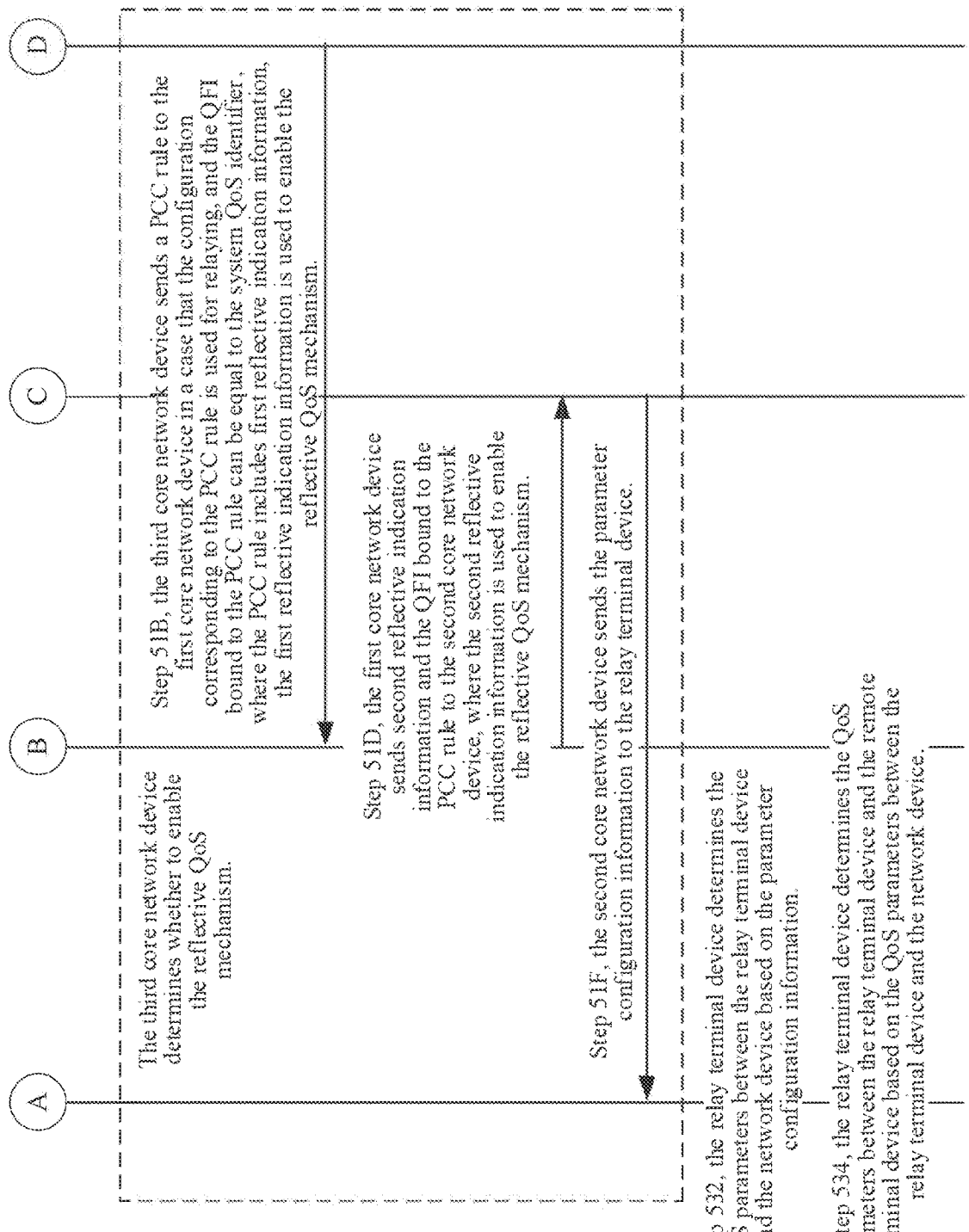

In an example, as shown in FIGS. 7A and 7B, the above step 510 includes the following sub-steps.

In sub-step 51A, the third core network device sends a PCC rule to the first core network device, where the PCC rule includes first reflective indication information, and the first reflective indication information is used to indicate whether to enable the reflective QoS mechanism.

For the description of sub-step 51A, please refer to the description of sub-step 512, which is not repeated here.

In sub-step 51C, the first core network device sends second reflective indication information and the QFI bound to the PCC rule to the second core network device, when the first reflective indication information indicates to enable the reflective QoS mechanism, a state of a configuration corresponding to the PCC rule is used for relaying, and the QFI bound to the PCC rule can be equal to the system QoS identifier. The second reflective indication information is used to enable the reflective QoS mechanism.

In embodiments of the present disclosure, after receiving the PCC rule, the first core network device determines whether to enable the reflective QoS mechanism. As can be seen from the above description, when the QFI bound to the PCC rule is equal to the system QoS identifier, the relay terminal device may determine the QoS parameters according to the QFI bound to the PCC rule. Therefore, the first core network device may determine whether to enable the reflective QoS mechanism according to whether the QFI bound to the PCC rule can be equal to the system QoS parameters.

In addition, as described in the above sub-step 514, since the parameter configuration information is sent to the relay terminal device during the relay communication process in embodiments of the present disclosure, the first core network device may also determine whether the configuration corresponding to the PCC rule is used for relaying. If the configuration corresponding to the PCC rule is not used for relaying, the first core network device does not need to configure the parameter configuration information for the terminal device. Optionally, the configuration corresponding to the PCC rule includes at least one of the following: the terminal device corresponding to the PCC rule, the PDU session corresponding to the PCC rule, and the SDF corresponding to the PCC rule.

In view of above, when the first reflective information received by the first core network device is used to enable the reflective QoS mechanism, the configuration corresponding to the PCC rule is used for relaying, and the QFI bound to the PCC rule can be equal to the system QoS identifier, the first core network device determines to enable the reflective QoS mechanism, and send the second reflective indication information and the QFI bound to the PCC rule to the second core network device, so as to inform the second core network device to enable the reflective QoS mechanism. In addition, in embodiments of the present disclosure, when the above mentioned three conditions are not satisfied simultaneously, the first core network device determines not to enable the reflective QoS mechanism.

In sub-step 51E, the second core network device sends the parameter configuration information to the relay terminal device.

The second core network device receives the second reflective indication information and the QFI bound to the PCC rule, and determines the parameter configuration information according to the QFI bound to the PCC rule when the reflective QoS mechanism is determined to be enabled. Optionally, the second core network device sets the QFI bound to the PCC rule in the header of the downlink data packet. That is, the parameter configuration information is carried in the header of the downlink data packet. Therefore, the relay terminal device may parse and obtain the QFI bound to the PCC rule after receiving the downlink data packet.

It is precisely because the condition that the QFI bound to the PCC rule is equal to the system QoS identifier can be established, the relay terminal device can specify the QoS parameters between the relay terminal device and the remote terminal device according to the QFI bound to the PCC rule. Therefore, the first core network device also needs to set the QFI bound to the PCC rule as the system QoS identifier. In view of above, optionally, as shown in FIGS. 7A and 7B, the above method further includes: the first core network device setting the QFI bound to the PCC rule as the system QoS identifier, when the configuration corresponding to the PCC rule is used for relaying, and the QFI bound to the PCC rule can be equal to the system QoS identifier.

In another example, as shown in FIGS. 7A and 7B, the above step 510 includes the following sub-steps.

In sub-step 51B, the third core network device sends a PCC rule to the first core network device, when the configuration corresponding to the PCC rule is used for relaying, and the QFI bound to the PCC rule can be equal to the system QoS identifier. The PCC rule includes first reflective indication information, and the first reflective indication information is used to enable the reflective QoS mechanism.

As can be seen from the above description, when the QFI bound to the PCC rule is equal to the system QoS identifier, the relay terminal device may determine the QoS parameters according to the QFI bound to the PCC rule. Therefore, the third core network device may determine whether to enable the reflective QoS mechanism according to whether the QFI bound to the PCC rule can be equal to the system QoS parameters. In addition, as described in the above sub-step 514, since the parameter configuration information is sent to the relay terminal device during the relay communication process in embodiments of the present disclosure, the third core network device may also determine whether the configuration corresponding to the PCC rule is used for relaying. If the configuration corresponding to the PCC rule is not used for relaying, the third core network device does not need to determine whether the QFI bound to the PCC rule can be equal to the system QoS identifier. Optionally, the configuration corresponding to the PCC rule includes at least one of the following: the terminal device corresponding to the PCC rule, the PDU session corresponding to the PCC rule, and the SDF corresponding to the PCC rule.

In view of above, when the third core network device determines that the configuration corresponding to the PCC rule is used for relaying, and the QFI bound to the PCC rule can be equal to the system QoS identifier, the third core network device determines to enable the reflective QoS mechanism, and sends the first reflective indication information to the first core network device, so as to inform the first core network device to enable the reflective QoS mechanism. In addition, in embodiments of the present disclosure, when the third core network device determines that the configuration corresponding to the PCC rule is used for relaying, and the QFI bound to the PCC rule cannot be equal to the system QoS identifier, the first core network device determines not to enable the reflective QoS mechanism.

In sub-step 51D, the first core network device sends second reflective indication information and the QFI bound to the PCC rule to the second core network device. The second reflective indication information is used to enable the reflective QoS mechanism.

When the first core network device receives the first reflective indication information, and explicitly indicates to enable the reflective QoS mechanism, the first core network device sends the second reflective indication information and the QFI bound to the PCC rule to the second core network device, so as to inform the second core network device to enable the reflective QoS mechanism.

In sub-step 51F, the second core network device sends the parameter configuration information to the relay terminal device.

For the description of sub-step 51F, please refer to the description of sub-step 51E, which is not repeated here.

It can be seen from the above description that the first core network device also needs to set the QFI bound to the PCC rule as the system QoS identifier. In embodiments of the present disclosure, the first core network device may either determine whether the QFI bound to the PCC rule needs to be set as the system QoS identifier by itself, or the third core network device may inform the first core network device whether the QFI bound to the PCC rule needs to be set as the system QoS identifier. In view of above, in an example, as shown in FIGS. 7A and 7B, the above method further includes: the third core network device sending identifier setting indication information to the first core network device, when the configuration corresponding to the PCC rule is used for relaying, and the QFI bound to the PCC rule can be equal to the system QoS identifier; and the first core network device setting the QFI bound to the PCC rule as the system QoS identifier according to the first identifier indication information. Optionally, the identifier indication information is carried in the PCC rule, or may be independent from the PCC rule, which is not limited in embodiments of the present disclosure. In another example, as shown in FIGS. 7A and 7B, the above method further includes: the first core network device setting the QFI bound to the PCC rule as the system QoS identifier, when the configuration corresponding to the PCC rule is used for relaying.

After the relay terminal device knows the parameter configuration information, namely, the QFI bound to the PCC rule, the QoS parameters between the relay terminal device and the remote terminal device may be determined according to the QFI. In view of above, as shown in FIGS. 7A and 7B, the above method further includes the following steps 532 and 534. In step 532, the relay terminal device determines the QoS parameters between the relay terminal device and the network device based on the parameter configuration information. In step 534, the relay terminal device determines the QoS parameters between the relay terminal device and the remote terminal device based on the QoS parameters between the relay terminal device and the network device.

In summary, in the technical solutions provided by embodiments of the present disclosure, a user plane functional entity in the core network sends the parameter configuration information to the relay terminal device during or after the process of enabling the reflective QoS mechanism.

The parameter configuration information includes QFI and the QFI is equal to the system QoS identifier. Since the relay terminal device knows the system QoS identifier, the relay terminal device may know the QoS parameters between the relay terminal device and the network device, and may further know the QoS parameters between the relay terminal device and the remote terminal device according to the QoS parameters between the relay terminal device and the network device. Therefore, the relay terminal device may determine the QoS parameters between the relay terminal device and the remote terminal device according to the QFI which is equal to the system QoS identifier. This helps to effectively ensure the quality of service transmission between the relay terminal device and the remote terminal device.

In the following, the technical solutions of the present disclosure are described and illustrated with several exemplary embodiments. It is assumed that the first core network device is SMF, the second core network device is UPF, the third core network device is PCF, and the system QoS identifier is 5QI, etc.

Figure 8:
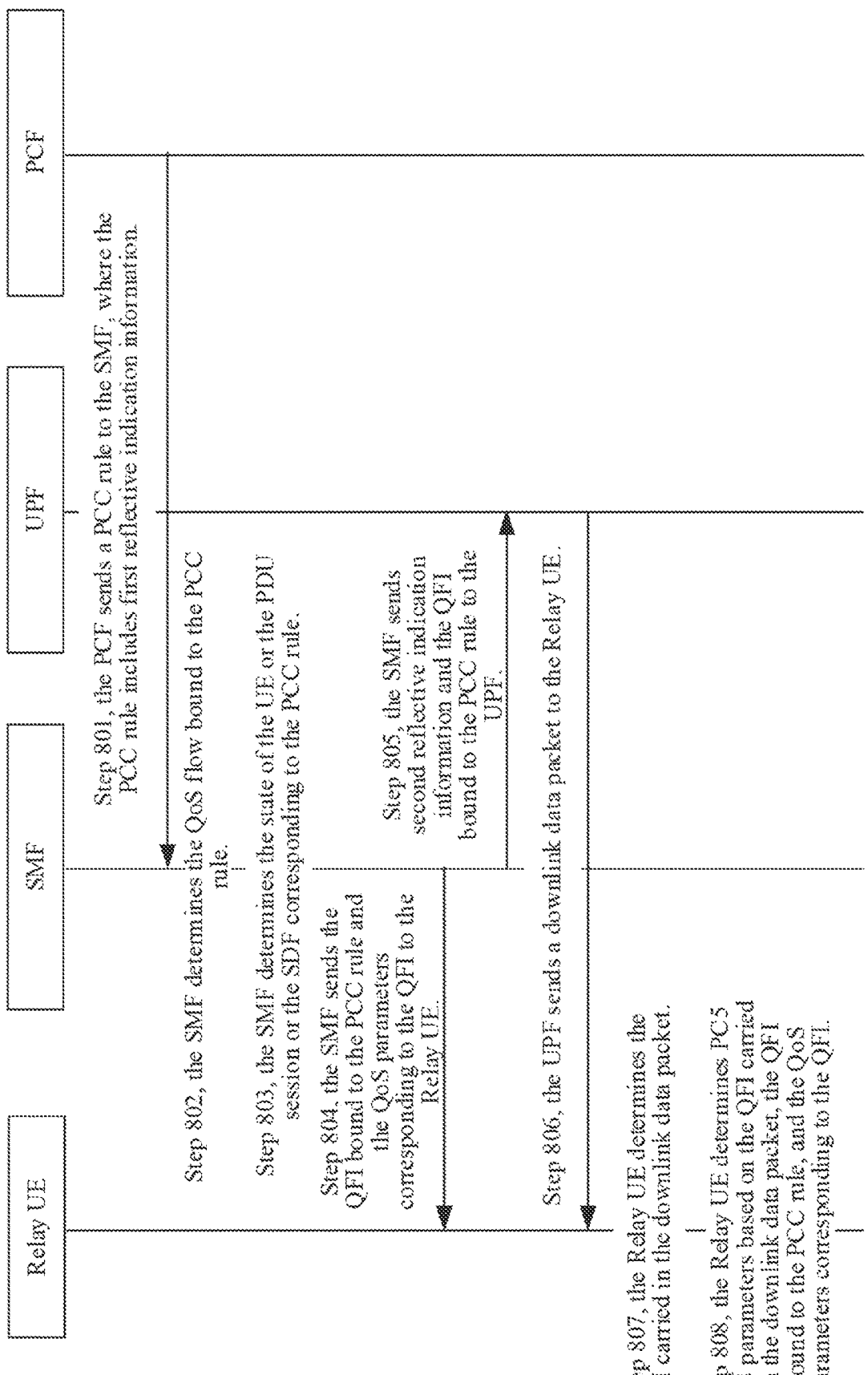
FIG. 8 is a flowchart of a parameter configuration method provided by still another embodiment of the present disclosure.

Reference is made to FIG. 8, which illustrates a flowchart of a parameter configuration method provided in an embodiment of the present disclosure. The method may be applied to the communication system shown in FIG. 1 or FIG. 4 above. The method may include the following steps.

In step 801, PCF sends a PCC rule to SMF, where the PCC rule includes first reflective indication information. The first reflective indication information is used for indicating to enable the reflective QoS mechanism.

In step 802, SMF determines the QoS flow bound to the PCC rule. After SMF determines the QoS flow bound to the PCC rule, the QFI corresponding to the QoS flow may be determined as the QFI bound to the PCC rule.

In step 803, SMF determines the state of UE or PDU session or SDF corresponding to the PCC rule. SMF needs to determine whether the UE or PDU session or SDF corresponding to the PCC rule is used for relaying.

In step 804, SMF sends the QFI bound to the PCC rule and the QoS parameters corresponding to the QFI to the Relay UE. The QoS parameters corresponding to QFI may be Uu QoS parameters or PC5 QoS parameters.

In step 805, SMF sends second reflective indication information and the QFI bound to the PCC rule to UPF. The second reflective indication information is configured for indicating to enable the reflective QoS mechanism.

In step 806, UPF sends a downlink data packet to the Relay UE. The downlink data packet carries the QFI and third reflective indication information. The third reflective indication information is configured for indicating to enable the reflective QoS mechanism.

In step 807, the Relay UE determines the QFI carried in the downlink data packet.

In step 808, the Relay UE determines PC5 QoS parameters based on the QFI carried in the downlink data packet, the QFI bound to the PCC rule, and the QoS parameters corresponding to the QFI.

In the above step 804, if the QoS parameters corresponding to the QFI acquired by the Relay UE are the PC5 QoS parameters, then in step 808, the Relay UE directly determines the QoS parameters corresponding to the QFI carried in the downlink data packet as the PC5 QoS parameters. Alternatively, if the QoS parameters corresponding to the QFI acquired by the Relay UE are the Uu QoS parameters, then in step 808, the Relay UE needs to further determine the PC5 QoS parameters based on the QoS parameters corresponding to the QFI carried in the downlink data packet.

Figure 9:
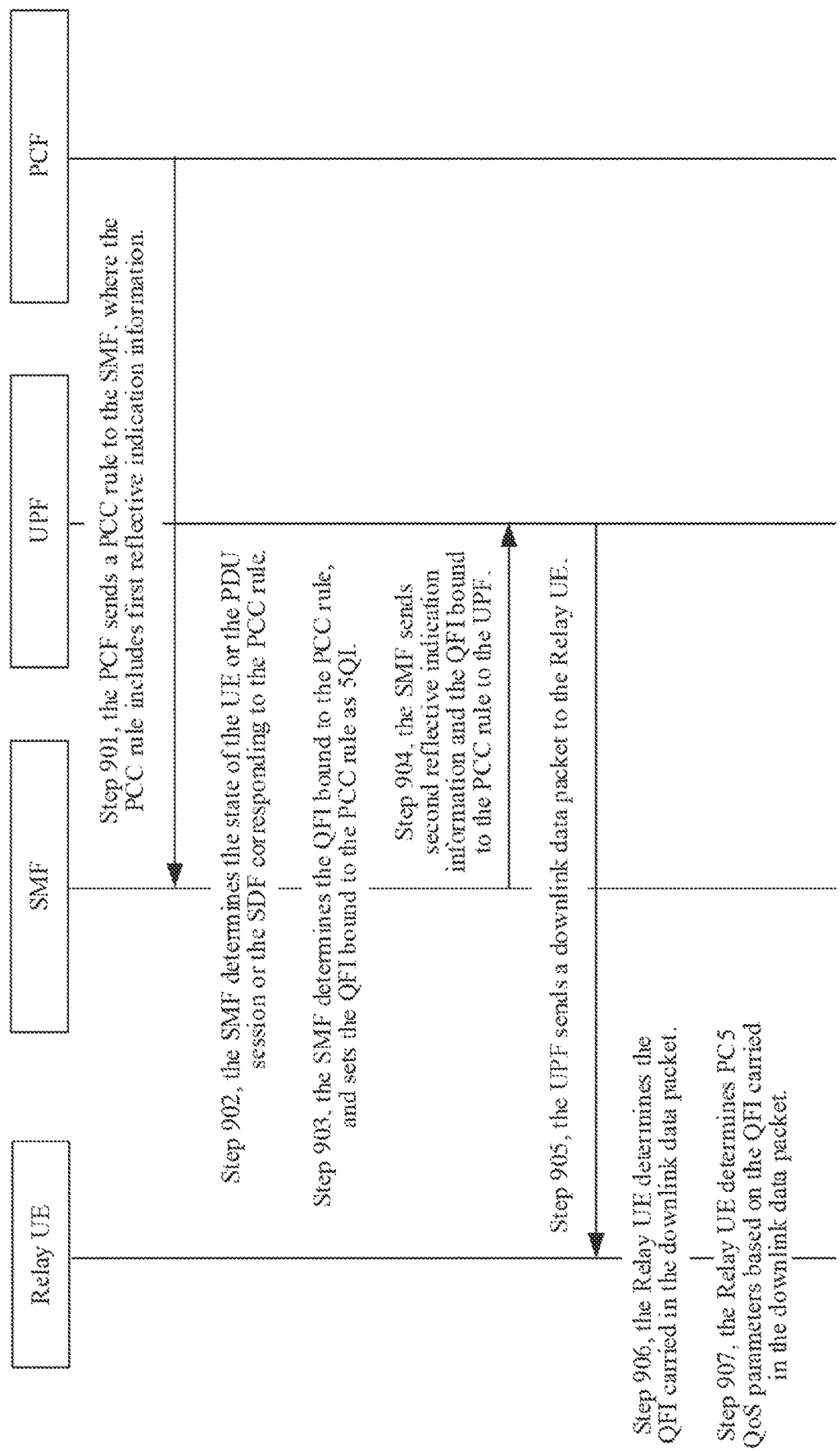
FIG. 9 is a flowchart of a parameter configuration method provided by still another embodiment of the present disclosure.

Reference is made to FIG. 9, which illustrates a flowchart of a parameter configuration method provided in an embodiment of the present disclosure. The method may be applied to the communication system shown in FIG. 1 or FIG. 4 above. The method may include the following steps.

In step 901, PCF sends a PCC rule to SMF, where the PCC rule includes first reflective indication information. The first reflective indication information is used for indicating whether to enable the reflective QoS mechanism. In an embodiment of the present disclosure, the PCC rule may further includes 5QI.

In step 902, SMF determines the state of UE or PDU session or SDF corresponding to the PCC rule. SMF needs to determine whether the UE or PDU session or SDF corresponding to the PCC rule is used for relaying.

When the first reflective indication information is configured for indicating to enable the reflective QoS mechanism, the UE or PDU session or SDF corresponding to the PCC rule is used for relaying, and 5QI can be set as the QFI bound to the PCC rule, SMF determines to enable the reflective QoS mechanism, and then performs the following steps.

In step 903, SMF determines the QFI bound to the PCC rule, and sets the QFI bound to the PCC rule as 5QI. SMF determines the QoS flow bound to the PCC rule, and thereby determines the QFI corresponding to the QoS flow, namely, the QFI bound to the PCC rule. At the same time, SMF sets the QFI bound to the PCC rule as 5QI. For example, SMF sets the value of the QFI bound to the PCC rule to the value of 5QI.

In step 904, SMF sends second reflective indication information and the QFI bound to the PCC rule to UPF. The second reflective indication information is configured for indicating to enable the reflective QoS mechanism.

In step 905, UPF sends a downlink data packet to the Relay UE. The downlink data packet carries QFI and third reflective indication information, where the third reflective indication information is configured for indicating to enable the reflective QoS mechanism.

In step 906, the Relay UE determines the QFI carried in the downlink data packet.

In step 907, the Relay UE determines PC5 QoS parameters based on the QFI carried in the downlink data packet. Since the QFI carried in the downlink data packet sent by SMF is equal to 5QI, the Relay UE may determine Uu QoS based on the QFI carried in the downlink data packet, and further determine PC5 QoS according to Uu QoS.

Figure 10:
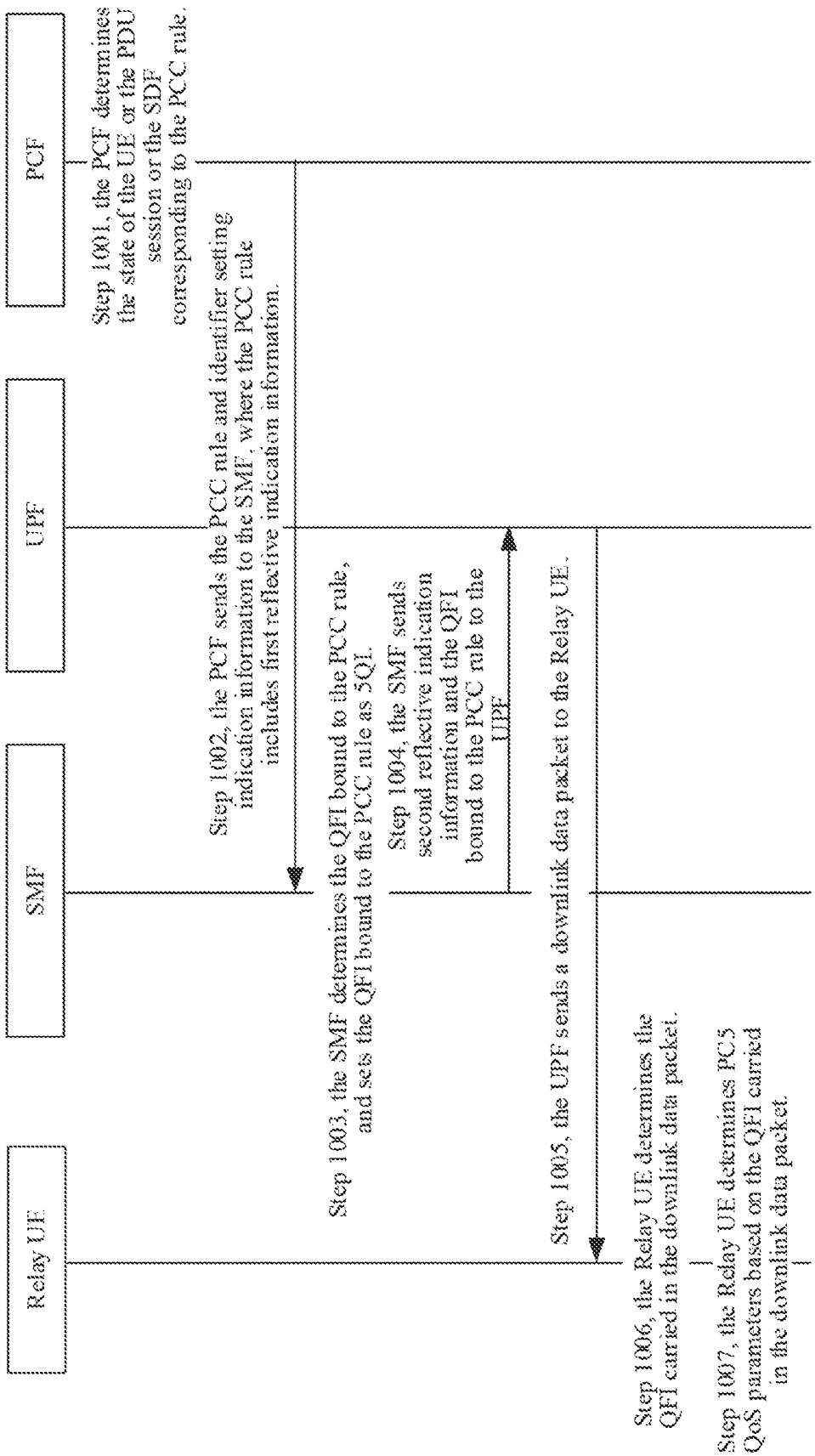
FIG. 10 is a flowchart of a parameter configuration method provided by still another embodiment of the present disclosure.

Reference is made to FIG. 10, which illustrates a flowchart of a parameter configuration method provided in an embodiment of the present disclosure. The method may be applied to the communication system shown in FIG. 1 or FIG. 4 above. The method may include the following steps.

In step 1001, PCF determines the state of UE or PDU session or SDF corresponding to the PCC rule. PCF needs to determine whether the UE or PDU session or SDF corresponding to the PCC rule is used for relaying.

When the UE or PDU session or SDF corresponding to the PCC rule is used for relaying and the 5QI can be set as the QFI bound to the PCC rule, PCF determines to enable the reflective QoS mechanism, and then performs the following steps.

In step 1002, PCF sends the PCC rule and identifier setting indication information to SMF. The PCC rule includes first reflective indication information. The first reflective indication information is configured for indicating to enable the reflective QoS mechanism, and the identification setting indication information is configured for indicating to set the QFI bound to the PCC rule as 5QI. The PCC rule may also include 5QI.

In step 1003, SMF determines the QFI bound to the PCC rule, and sets the QFI bound to the PCC rule as 5QI. Once SMF determines the QoS flow bound to the PCC rule, it may determine the QFI corresponding to the QoS flow, namely, the QFI bound to the PCC rule. At the same time, SMF sets the QFI bound to the PCC rule as 5QI. For example, SMF sets the value of the QFI bound to the PCC rule to be the value of 5QI.

In step 1004, SMF sends second reflective indication information and the QFI bound to the PCC rule to UPF. The second reflective indication information is configured for indicating to enable the reflective QoS mechanism.

In step 1005, UPF sends a downlink data packet to the Relay UE. The downlink data packet carries QFI and third reflective indication information. The third reflective indication information is configured for indicating to enable the reflective QoS mechanism.

In step 1006, the Relay UE determines the QFI carried in the downlink data packet.

In step 1007, the Relay UE determines PC5 QoS parameters based on the QFI carried in the downlink data packet. Since the QFI carried in the downlink data packet sent by SMF is equal to 5QI, the Relay UE may determine Uu QoS based on the QFI carried in the downlink data packet, and further determine PC5 QoS according to Uu QoS.

Figure 11:
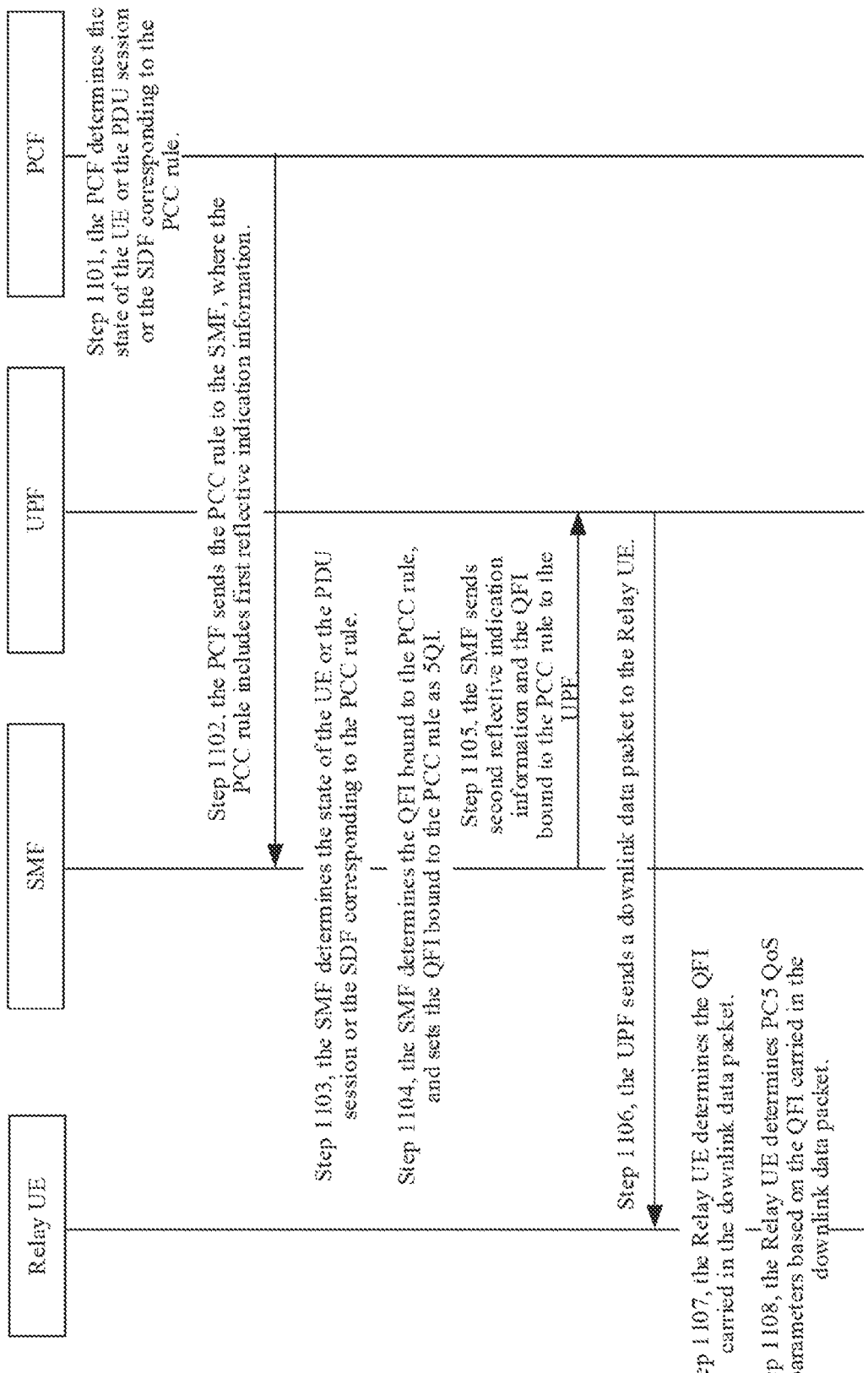
FIG. 11 is a flowchart of a parameter configuration method provided by still another embodiment of the present disclosure.

Reference is made to FIG. 11, which illustrates a flowchart of a parameter configuration method provided in an embodiment of the present disclosure. The method may be applied to the communication system shown in FIG. 1 or FIG. 4 above. The method may include the following steps.

In step 1101, PCF determines the state of UE or PDU session or SDF corresponding to the PCC rule. PCF needs to determine whether the UE or PDU session or SDF corresponding to the PCC rule is used for relaying.

When the UE or PDU session or SDF corresponding to the PCC rule is used for relaying and 5QI can be set as the QFI bound to the PCC rule, PCF determines to enable the reflective QoS mechanism, and then performs the following steps.

In step 1102, PCF sends the PCC rule to SMF, where the PCC rule includes first reflective indication information. The first reflective indication information is configured for indicating to enable the reflective QoS mechanism. The PCC rule may also include 5QI.

In step 1103, SMF determines the state of UE or PDU session or SDF corresponding to the PCC rule. SMF needs to determine whether the UE or PDU session or SDF corresponding to the PCC rule is used for relaying.

In a case that SMF determines the UE or PDU session or SDF corresponding to the PCC rule is used for relaying, the following steps are performed.

In step 1104, SMF determines the QFI bound to the PCC rule, and sets the QFI bound to the PCC rule as 5QI. Once SMF determines the QoS flow bound to the PCC rule, it may determine the QFI corresponding to the QoS flow, namely, the QFI bound to the PCC rule. At the same time, SMF sets the QFI bound to the PCC rule as 5QI. For example, SMF sets the value of the QFI bound to the PCC rule to be the value of 5QI.

In step 1105, SMF sends second reflective indication information and the QFI bound to the PCC rule to UPF. The second reflective indication information is configured for indicating to enable the reflective QoS mechanism.

In step 1106, UPF sends a downlink data packet to the Relay UE. The downlink data packet carries QFI and third reflective indication information, where the third reflective indication information is configured for indicating to enable the reflective QoS mechanism.

In step 1107, the Relay UE determines the QFI carried in the downlink data packet.

In step 1108, the Relay UE determines PC5 QoS parameters based on the QFI carried in the downlink data packet. Since the QFI carried in the downlink data packet sent by SMF is equal to 5QI, the Relay UE may determine Uu QoS based on the QFI carried in the downlink data packet, and further determine PC5 QoS according to Uu QoS.

It should be noted that embodiments of the present disclosure introduce and describe the parameter configuration method provided by embodiments of the present disclosure from the perspective of interactions between the relay terminal device and the core network. The above descriptions related to the steps executed by the relay terminal device may be independently implemented as a parameter configuration method at the relay terminal equipment side, and the above descriptions related to the steps executed by the core network may be independently implemented as a parameter configuration method at the core network side.

The following are apparatus embodiments of the present disclosure, which may be used to perform the method embodiments of the present disclosure. For details not disclosed in the apparatus embodiments of the present disclosure, please refer to the method embodiments of the present disclosure.

Figure 12:
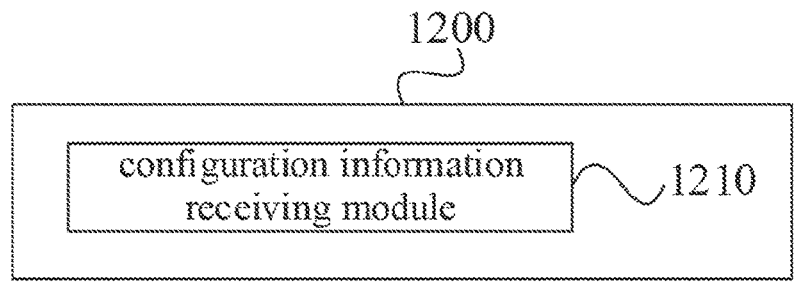
FIG. 12 is a block diagram of a parameter configuration apparatus provided by an embodiment of the present disclosure.

Reference is made to FIG. 12, which illustrates a block diagram of a parameter configuration apparatus provided by an embodiment of the present disclosure. The apparatus is configured to implement the above-mentioned method examples at the relay terminal device side, and it may be implemented by hardware, or implemented by executing respective software by hardware. The apparatus may be the relay terminal device described above, or may be arranged in the relay terminal device. As shown in FIG. 12, the apparatus 1200 may include: a configuration information receiving module 1210.

The configuration information receiving module 1210 is configured to receive parameter configuration information from a core network. The parameter configuration information is used for configuring QoS parameters between the relay terminal device and a remote terminal device, when a reflective QoS mechanism is enable.

In an example, the parameter configuration information includes a QFI bound to a PCC rule, and QoS parameters corresponding to the QFI.

In an example, the QoS parameters corresponding to the QFI includes at least one of the following: QoS parameters between the relay terminal device and the remote terminal device, and QoS parameters between the relay terminal device and a network device.

In an example, the core network includes a first core network device, and the first core network device provides control plane functions. The parameter configuration information is carried in a control plane message exchanged between the first core network device and the relay terminal device.

Figure 13:
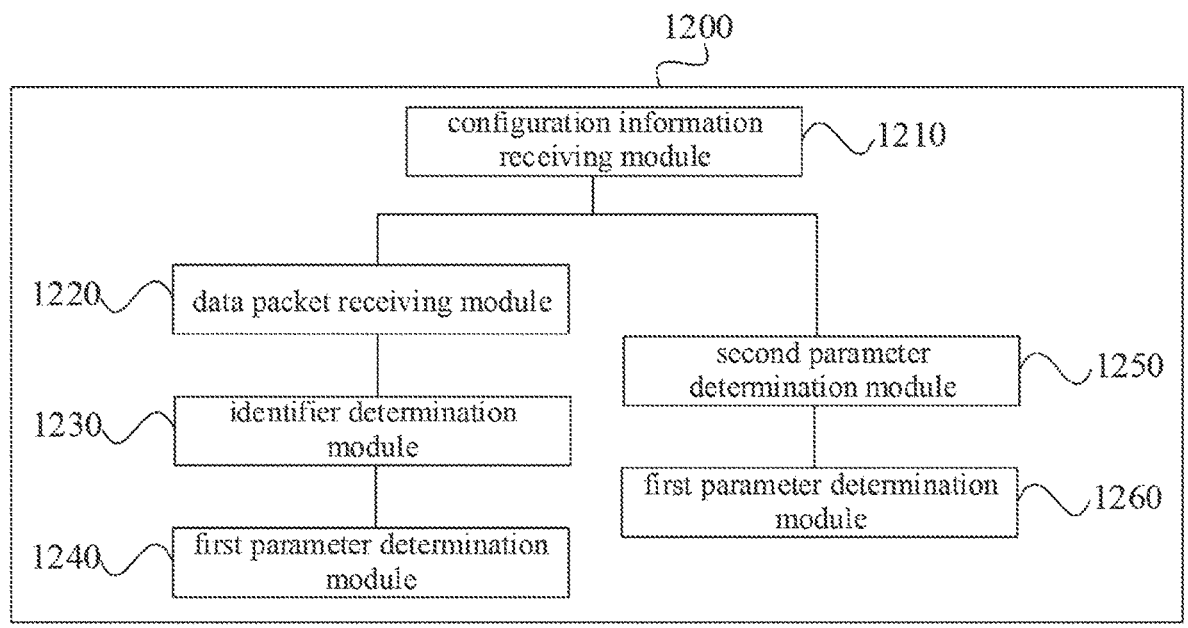
FIG. 13 is a block diagram of a parameter configuration apparatus provided by another embodiment of the present disclosure.

In an example, the core network includes a second core network device, and the second core network device is configured to provide a user plane function. As shown in FIG. 13, the apparatus 1200 further includes: a data packet receiving module 1220, configured to receive a downlink data packet from the second core network device; an identifier determination module 1230, configured to determine a QFI carried in the downlink data packet; and a first parameter determination module 1240, configured to determine QoS parameters between the relay terminal device and the remote terminal device based on the parameter configuration information and the QFI carried in the downlink data packet.

In an example, the QoS parameters corresponding to the QFI includes the QoS parameters between the relay terminal device and the remote terminal device. As shown in FIG. 13, the first parameter determination module 1240 is further configured to determine QoS parameters corresponding to the QFI carried in a header of the downlink data packet as the QoS parameters between the relay terminal device and the remote terminal device.

In an example, the QoS parameters corresponding to the QFI includes the QoS parameters between the relay terminal device and the network device. As shown in FIG. 13, the first parameter determination module 1240 is configured to determine QoS parameters corresponding to the QFI carried in a header of the downlink data packet as the QoS parameters between the relay terminal device and the network device; and determine the QoS parameters between the relay terminal device and the remote terminal device based on the QoS parameters between the relay terminal device and the network device.

In an example, the parameter configuration information includes a QFI bound to a PCC rule, where the QFI bound to the PCC rule is equal to a system QoS identifier.

In an example, the system QoS identifier includes a 5QI.

In an example, the core network includes a second core network device, and the second core network device is configured to provide a user plane function. The parameter configuration information is carried in a user plane message exchanged between the second core network device and the relay terminal device.

In an example, the user plane message includes a downlink data packet, and the parameter configuration information is carried in a header of the downlink data packet.

In an example, as shown in FIG. 13, the apparatus 1200 further includes: a second parameter determination module 1250, configured to determine QoS parameters between the relay terminal device and a network device based on the parameter configuration information; and a first parameter determination module 1260, configured to determine QoS parameters between the relay terminal device and the remote terminal device based on the QoS parameters between the relay terminal device and the network device.

In summary, the technical solutions provided by embodiments of the present disclosure solves the defect that the relay terminal device cannot obtain the QoS parameters in the relay communication system when the core network enables the reflective QoS mechanism, and ensures the quality of service transmission between the relay terminal device and the remote terminal device. This is accomplished by sending the parameter configuration information from the core network to the relay terminal device to configure the QoS parameters between the relay terminal device and the remote terminal device, when the core network determines to enable the reflective QoS mechanism. In addition, in embodiments of the present disclosure, it is not limited which functional entity in the core network sends the parameter configuration information to the relay terminal device. Thus, in a practical application process, the sending entity of the parameter configuration entity may be flexibly set according to the known information interaction architecture. This on the one hand matches the known information interaction architecture and improves the compatibility and efficiency of parameter configuration, and on the other hand, improves the flexibility of parameter configuration.

Figure 14:
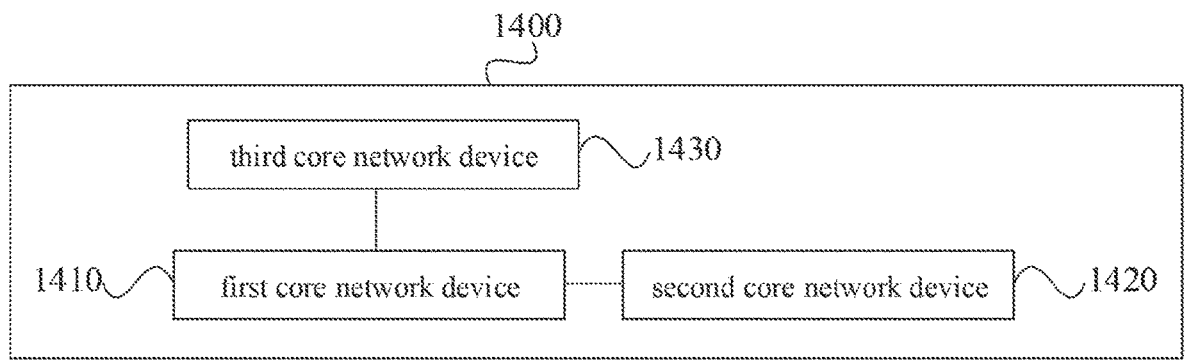
FIG. 14 is a block diagram of a parameter configuration system provided by an embodiment of the present disclosure.

Reference is made to FIG. 14, which illustrates a block diagram of a parameter configuration system provided by an embodiment of the present disclosure. The system is configured to implement the above-mentioned method examples at the core network side, and it may be implemented by hardware, or implemented by executing respective software by hardware. The system may be the core network described above, or may be arranged in the core network.

The parameter configuration system 1400 is configured to: send parameter configuration information to a relay terminal device. The parameter configuration information is used for configuring QoS parameters between the relay terminal device and a remote terminal device, when a reflective QoS mechanism is enabled.

In an example, the parameter configuration information includes a QFI bound to a PCC rule, and QoS parameters corresponding to the QFI.

In an example, the QoS parameters corresponding to the QFI includes at least one of the following: QoS parameters between the relay terminal device and the remote terminal device, and QoS parameters between the relay terminal device and a network device.

In an example, the parameter configuration system 1400 includes a first core network device 1410, and the first core network device provides control plane functions. The parameter configuration information is carried in a control plane message exchanged between the first core network device 1410 and the relay terminal device.

In an example, as shown in FIG. 14, the parameter configuration system 1400 includes a first core network device 1410 and a third core network device 1430. The first core network device 1410 and the third core network device 1430 provide control plane functions. The third core network device 1430 is configured to send the PCC rule to the first core network device, the PCC rule includes first reflective indication information, and the first reflective indication information is used to indicate whether to enable the reflective QoS mechanism. The first core network device 1410 is configured to determine a state of a configuration corresponding to the PCC rule. The first core network device 1410 is further configured to send the parameter configuration information to the relay terminal device, when the first reflective indication information is used to enable the reflective QoS mechanism, and the configuration corresponding to the PCC rule is used for relaying.

In an example, the parameter configuration information includes a QFI bound to a PCC rule, and the QFI bound to the PCC rule is equal to a system QoS identifier.

In an example, the system QoS identifier includes a 5QI.

In an example, as shown in FIG. 14, the parameter configuration system 1400 includes a second core network device 1420, and the second core network device 1420 is configured to provide a user plane function. The parameter configuration information is carried in a user plane message exchanged between the second core network device 1420 and the relay terminal device.

In an example, the user plane message includes a downlink data packet, and the parameter configuration information is carried in a header of the downlink data packet.

In an example, as shown in FIG. 14, the parameter configuration system 1400 includes a first core network device 1410, a second core network device 1420 and a third core network device 1430. The first core network device

1410 and the third core network device 1430 provide control plane functions. The second core network device 1420 is configured to provide a user plane function. The third core network device 1430 is configured to send the PCC rule to the first core network device. The PCC rule includes first reflective indication information, and the first reflective indication information is used to indicate whether to enable the reflective QoS mechanism. The first core network device 1410 is configured to send second reflective indication information and the QFI bound to the PCC rule to the second core network device, in a case that the first reflective indication information is used to indicate whether to enable the reflective QoS mechanism, a configuration corresponding to the PCC rule is used for relaying, and the QFI bound to the PCC rule can be equal to the system QoS identifier. The second reflective indication information is used to enable the reflective QoS mechanism. The second core network device 1420 is configured to send the parameter configuration information to the relay terminal device.

In an example, as shown in FIG. 14, the first core network 1410 is further configured to: set the system QoS identifier as the QFI bound to the PCC rule, when the configuration corresponding to the PCC rule is used for relaying, and the QFI bound to the PCC rule can be equal to the system QoS identifier.

In an example, as shown in FIG. 14, the parameter configuration system 1400 includes a first core network device 1410, a second core network device 1420 and a third core network device 1430. The first core network device 1410 and the third core network device 1430 provide control plane functions. The second core network device 1420 is configured to provide a user plane function. The third core network device 1430 is configured to send the PCC rule to the first core network device, in a case that a configuration corresponding to the PCC rule is used for relaying, and the QFI bound to the PCC rule can be equal to the system QoS identifier. The PCC rule includes first reflective indication information, and the first reflective indication information is used to indicate whether to enable the reflective QoS mechanism. The first core network device 1410 is configured to send second reflective indication information and the QFI bound to the PCC rule to the second core network device. The second reflective indication information is used to enable the reflective QoS mechanism. The second core network device 1420 is configured to send the parameter configuration information to the relay terminal device.

In an example, as shown in FIG. 14, the third core network device 1430 is further configured to send identifier setting indication information to the first core network device, in a case that the configuration corresponding to the PCC rule is used for relaying, and the QFI bound to the PCC rule can be equal to the system QoS identifier. The first core network device 1410 is further configured to set the system QoS identifier as the QFI bound to the PCC rule according to the first identifier indication information.

In an example, as shown in FIG. 14, the first core network device 1410 is further configured to set the system QoS identifier as the QFI bound to the PCC rule, in a case that the configuration corresponding to the PCC rule is used for relaying.

In an example, the configuration corresponding to the PCC rule includes at least one of the following: a terminal device corresponding to the PCC rule, a PDU session corresponding to the PCC rule, and a service data flow (SDF) corresponding to the PCC rule.

It should be noted that, when the apparatus provided in the above embodiments realizes its functions, the division of the above functional modules is only used as an example for illustration. In practical applications, the above-mentioned functions may be assigned to different functional modules according to actual needs. That is, the inner structure of the apparatus is divided into different functional modules to accomplish all or part of the functions described above.

Regarding the apparatus in the above-mentioned embodiments, the specific mode in which each module performs the operation has been described in detail in embodiments of the method, and will not be described in detail herein.

Figure 15:
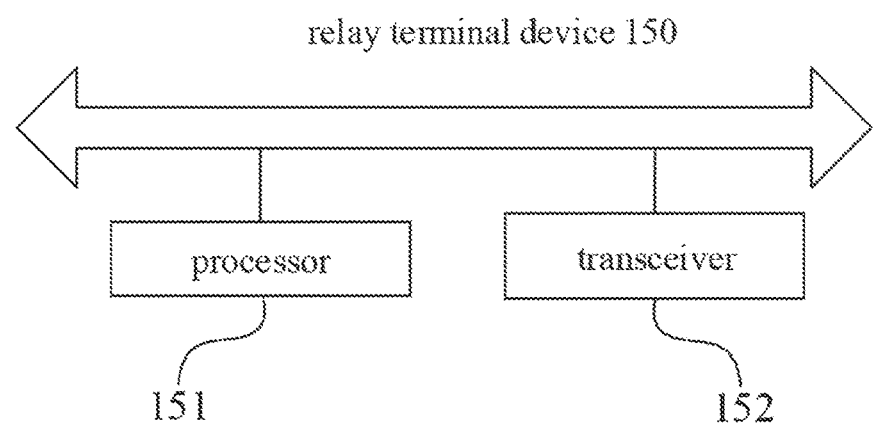
FIG. 15 is a structural block diagram of a relay terminal device provided by an embodiment of the present disclosure.

Reference is made to FIG. 15, which illustrates a schematic structural diagram of a relay terminal device 150 provided in an embodiment of the present disclosure. For example, the relay terminal device may be configured to perform the above-mentioned parameter configuration method at the relay terminal device side. Specifically, the relay terminal device 150 may include: a processor 151, and a transceiver 152 connected to the processor 151.

The processor 151 includes one or more processing cores, and the processor 151 executes various functional applications and information processing by running software programs and modules.

The transceiver 152 includes a receiver and a transmitter. Optionally, transceiver 152 is a communication chip.

In one example, the relay terminal device 150 further includes: a memory and a bus. The memory is connected to the processor through the bus. The memory may be configured to store a computer program, and the processor is configured to execute the computer program so as to implement steps performed by the relay terminal device in the above method embodiments.

In addition, the memory may be implemented by any type of volatile or non-volatile storage devices, or implemented by their combination. The volatile or non-volatile storage devices include but are not limited to: Random-Access Memory (RAM) and Read-Only Memory (ROM), Erasable Programmable Read-Only Memory (EPROM), Electrically Erasable Programmable Read-Only Memory (EEPROM), flash memory or other solid state storage technology, Compact Disc Read-Only Memory (CD-ROM), Digital Video Disc (DVD) or other optical storage, cassettes, tapes, disk storage or other magnetic storage devices.

The transceiver 152 is configured to receive parameter configuration information from a core network. The parameter configuration information is used to configure QoS parameters between the relay terminal device and a remote terminal device, in a case that a reflective QoS mechanism is enabled.

In an example, the parameter configuration information includes a QFI bound to a Policy and Charging Control (PCC) rule, and QoS parameters corresponding to the QFI.

In an example, the QoS parameters corresponding to the QFI includes at least one of the following: QoS parameters between the relay terminal device and the remote terminal device, and QoS parameters between the relay terminal device and a network device.

In an example, the core network includes a first core network device, and the first core network device provides control plane functions. The parameter configuration information is carried in a control plane message exchanged between the first core network device and the relay terminal device.

In an example, the core network includes a second core network device, and the second core network device is configured to provide a user plane function. The transceiver 152 is configured to receive a downlink data packet from the second core network device. The processor 151 is configured to determine QFI carried in the downlink data packet. The processor 151 is further configured to determine the QoS parameters between the relay terminal device and the remote terminal device based on the parameter configuration information and the QFI carried in the downlink data packet.

In an example, the QoS parameters corresponding to the QFI includes the QoS parameters between the relay terminal device and the remote terminal device. The processor 151 is configured to determine QoS parameters corresponding to the QFI carried in a header of the downlink data packet as the QoS parameters between the relay terminal device and the remote terminal device.

In an example, the QoS parameters corresponding to the QFI includes the QoS parameters between the relay terminal device and the network device. The processor 151 is configured to determine QoS parameters corresponding to the QFI carried in a header of the downlink data packet as the QoS parameters between the relay terminal device and the network device, and determine the QoS parameters between the relay terminal device and the remote terminal device based on the QoS parameters between the relay terminal device and the network device.

In an example, the parameter configuration information includes a QFI bound to a PCC rule, where the QFI bound to the PCC rule is equal to a system QoS identifier.

In an example, the system QoS identifier includes a 5QI.

In an example, the core network includes a second core network device, and the second core network device is configured to provide a user plane function. The parameter configuration information is carried in a user plane message exchanged between the second core network device and the relay terminal device.

In an example, the user plane message includes a downlink data packet, and the parameter configuration information is carried in a header of the downlink data packet.

In an example, the processor 151 is configured to determine QoS parameters between the relay terminal device and a network device based on the parameter configuration information, and determine QoS parameters between the relay terminal device and the remote terminal device based on the QoS parameters between the relay terminal device and the network device.

Figure 16:
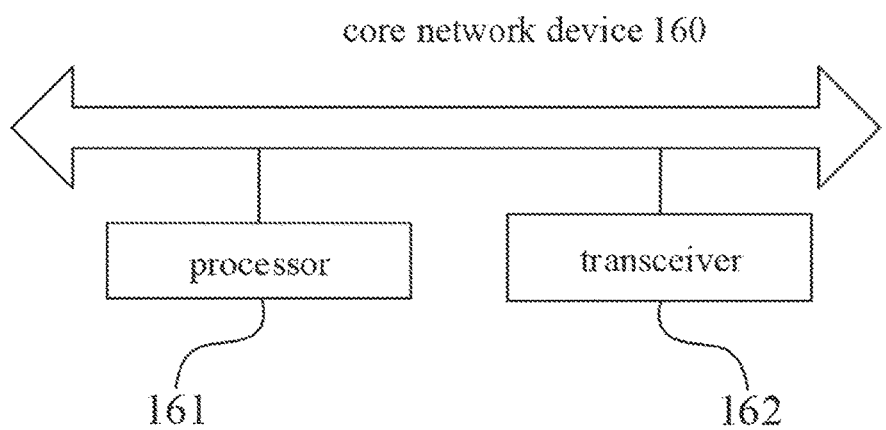
FIG. 16 is a structural block diagram of a core network device provided by an embodiment of the present disclosure.

Reference is made to FIG. 16, which illustrates a schematic structural diagram of a core network device 160 provided in an embodiment of the present disclosure. For example, the core network device may be configured to perform the above-mentioned parameter configuration method at the core network device side. Specifically, the core network device 160 may include: a processor 161, and a transceiver 162 connected to the processor 161.

The processor 161 includes one or more processing cores, and the processor 161 executes various functional applications and information processing by running software programs and modules.

The transceiver 162 includes a receiver and a transmitter. Optionally, transceiver 162 is a communication chip.

In an example, the core network device 160 further includes: a memory and a bus. The memory is connected to the processor through the bus. The memory may be configured to store a computer program, and the processor is configured to execute the computer program so as to implement steps performed by the core network device in the above method embodiments.

In addition, the memory may be implemented by any type of volatile or non-volatile storage devices, or implemented by their combination. The volatile or non-volatile storage devices include but are not limited to: Random-Access Memory (RAM) and Read-Only Memory (ROM), Erasable Programmable Read-Only Memory (EPROM), Electrically Erasable Programmable Read-Only Memory (EEPROM), flash memory or other solid state storage technology, Compact Disc Read-Only Memory (CD-ROM), Digital Video Disc (DVD) or other optical storage, cassettes, tapes, disk storage or other magnetic storage devices.

The transceiver 162 is configured to send parameter configuration information to a relay terminal device. The parameter configuration information is used to configure QoS parameters between the relay terminal device and a remote terminal device, when a reflective QoS mechanism is enabled.

In an example, the parameter configuration information includes a QFI bound to a PCC rule, and QoS parameters corresponding to the QFI.

In an example, the QoS parameters corresponding to the QFI includes at least one of the following: QoS parameters between the relay terminal device and the remote terminal device, and QoS parameters between the relay terminal device and a network device.

In an example, the parameter configuration system includes a first core network device, and the first core network device provides control plane functions. The parameter configuration information is carried in a control plane message exchanged between the first core network device and the relay terminal device.

In an example, the parameter configuration system includes a first core network device and a third core network device. The first core network device and the third core network device provide control plane functions. The transceiver of the third core network device is configured to send the PCC rule to the first core network device. The PCC rule includes first reflective indication information. The first reflective indication information is used to indicate whether to enable the reflective QoS mechanism. The processor of the first core network device is configured to determine a state of a configuration corresponding to the PCC rule. The processor of the first core network device is further configured to send the parameter configuration information to the relay terminal device, in a case that the first reflective indication information is used to enable the reflective QoS mechanism, and the configuration corresponding to the PCC rule is used for relaying.

In an example, the parameter configuration information includes a QFI bound to a PCC rule, where the QFI bound to the PCC rule is equal to a system QoS identifier.

In an example, the system QoS identifier includes a 5QI.

In an example, the parameter configuration system includes a second core network device, and the second core network device is configured to provide a user plane function. The parameter configuration information is carried in a user plane message exchanged between the second core network device and the relay terminal device.

In an example, the user plane message includes a downlink data packet, and the parameter configuration information is carried in a header of the downlink data packet.

In an example, the parameter configuration system includes a first core network device, a second core network device and a third core network device. The first core network device and the third core network device provide control plane functions. The second core network device is configured to provide a user plane function. The transceiver of the third core network device is configured to send the PCC rule to the first core network device. The PCC rule includes first reflective indication information, and the first reflective indication information is used to indicate whether to enable the reflective QoS mechanism. The transceiver of the first core network device is configured to send second reflective indication information and the QFI bound to the PCC rule to the second core network device, in a case that the first reflective indication information is used to indicate whether to enable the reflective QoS mechanism, a configuration corresponding to the PCC rule is used for relaying, and the QFI bound to the PCC rule can be equal to the system QoS identifier. The second reflective indication information is used to enable the reflective QoS mechanism. The transceiver of the second core network device is configured to send the parameter configuration information to the relay terminal device.

In an example, the processor of the first core network device is further configured to set the system QoS identifier as the QFI bound to the PCC rule, in a case that the configuration corresponding to the PCC rule is used for relaying, and the QFI bound to the PCC rule can be equal to the system QoS identifier.

In an example, the parameter configuration system includes a first core network device, a second core network device and a third core network device. The first core network device and the third core network device provide control plane functions. The second core network device is configured to provide a user plane function. The transceiver of the third core network device is configured to send the PCC rule to the first core network device, in a case that a configuration corresponding to the PCC rule is used for relaying, and the QFI bound to the PCC rule can be equal to the system QoS identifier. The PCC rule includes first reflective indication information, and the first reflective indication information is used to indicate whether to enable the reflective QoS mechanism. The transceiver of the first core network device is configured to send second reflective indication information and the QFI bound to the PCC rule to the second core network device. The second reflective indication information is used to enable the reflective QoS mechanism. The transceiver of the second core network device is configured to send the parameter configuration information to the relay terminal device.

In an example, the transceiver of the third core network device is configured to send identifier setting indication information to the first core network device, in a case that the configuration corresponding to the PCC rule is used for relaying, and the QFI bound to the PCC rule can be equal to the system QoS identifier. The processor of the first core network device is further configured to set the system QoS identifier as the QFI bound to the PCC rule according to the first identifier indication information.

In an example, the processor of the first core network device is further configured to set the system QoS identifier as the QFI bound to the PCC rule, in a case that the configuration corresponding to the PCC rule is used for relaying.

In an example, the configuration corresponding to the PCC rule includes at least one of the following: a terminal device corresponding to the PCC rule, a PDU session corresponding to the PCC rule, and a service data flow (SDF) corresponding to the PCC rule.

Embodiments of the present disclosure further provide a computer-readable storage medium, where a computer program is stored in the storage medium, and the computer program is configured to be executed by a processor of a relay terminal device to implement the aforementioned parameter configuration method at the relay terminal device side.

Embodiments of the present disclosure further provide a computer-readable storage medium, where a computer program is stored in the storage medium, and the computer program is configured to be executed by a processor of a core network device to implement the aforementioned parameter configuration method at the core network device side.

Embodiments of the present disclosure further provide a chip, where the chip includes a programmable logic circuit and/or program instructions, and the chip is configured to implement the aforementioned parameter configuration method at the relay terminal device side when the chip runs on the relay terminal device.

Embodiments of the present disclosure further provide a chip, where the chip includes a programmable logic circuit and/or program instructions, and the chip is configured to implement the aforementioned parameter configuration method at the core network device side when the chip runs on the core network device.

Embodiments of the present disclosure further provide a computer program product, which is configured to implement the aforementioned parameter configuration method at the relay terminal device side when the computer program product runs on the relay terminal device.

Embodiments of the present disclosure further provide a computer program product, which is configured to implement the aforementioned parameter configuration method at the core network device side when the computer program product runs on the core network device.

A skilled person in the art shall be aware that in one or more of the above examples, the functions described in embodiments of the present disclosure may be implemented by hardware, software, firmware, or any combination thereof. When the functions are implemented by software, these functions may be stored in a computer-readable medium or transmitted as one or more instructions or codes on a computer-readable medium. The computer-readable medium includes both computer storage medium and communication medium. The communication medium includes any medium that facilitates transmission of computer programs from one place to another. The storage medium may be any available medium accessible to a general purpose or specialized computer.

The above mentioned descriptions are merely exemplary embodiments of the present disclosure, and are not intended to limit the present disclosure. Any modifications, equivalent replacements, improvements, etc. made within the spirit and principle of the present disclosure shall be included within the protection scope of the present disclosure.

What is claimed is:

1. A parameter configuration method, applied to a core network, wherein the method comprises:
    sending parameter configuration information to a relay terminal device,
    wherein the parameter configuration information is used for configuring Quality of Service QoS parameters between the relay terminal device and a remote terminal device when a reflective QoS mechanism is enabled;
    wherein the parameter configuration information comprises a QoS flow identifier QFI bound to a Policy and Charging Control PCC rule, and QoS parameters corresponding to the QFI;
    wherein the core network comprises a first core network device and a third core network device, the first core network device and the third core network device providing control plane functions; and wherein the sending the parameter configuration information to the relay terminal device, comprises:

sending, by the third core network device, the PCC rule to the first core network device, wherein the PCC rule comprises first reflective indication information, and the first reflective indication information is used to indicate whether to enable the reflective QoS mechanism;

determining, by the first core network device, a state of a configuration corresponding to the PCC rule; and sending, by the first core network device, the parameter configuration information to the relay terminal device, when the first reflective indication information is used to enable the reflective QoS mechanism, and the configuration corresponding to the PCC rule is used for relaying.

2. The method according to claim 1, wherein the QoS parameters corresponding to the QFI comprises QoS parameters between the relay terminal device and a network device.

3. The method according to claim 1, wherein the core network comprises a first core network device, the first core network device provides control plane functions, and the parameter configuration information is carried in a control plane message exchanged between the first core network device and the relay terminal device.

4. The method according to claim 1, wherein the parameter configuration information comprises a QFI bound to a PCC rule, and the QFI bound to the PCC rule is equal to a system QoS identifier.

5. The method according to claim 4, wherein the system QoS identifier comprises a fifth generation mobile communication system QoS identifier 5QI.

6. The method according to claim 1, wherein the configuration corresponding to the PCC rule comprises a PDU session corresponding to the PCC rule.

7. A relay terminal device, comprising a processor, and a transceiver connected to the processor, wherein the transceiver is configured to receive parameter configuration information from a core network; and the parameter configuration information is used for configuring Quality of Service QoS parameters between the relay terminal device and a remote terminal device when a reflective QoS mechanism is enabled, wherein the parameter configuration information comprises a QoS flow identifier QFI bound to a Policy and Charging Control PCC rule, and QoS parameters corresponding to the QFI;

the core network comprises a first core network device and a third core network device, the first core network device and the third core network device providing control plane functions;

the third core network device is configured to send the PCC rule to the first core network device, wherein the PCC rule comprises first reflective indication information, and the first reflective indication information is used to indicate whether to enable the reflective QoS mechanism;

the first core network device is configured to determine a state of a configuration corresponding to the PCC rule; and the transceiver is configured to receive the parameter configuration information from the first core network device, when the first reflective indication information is used to enable the reflective QoS mechanism, and the configuration corresponding to the PCC rule is used for relaying.

8. The relay terminal device according to claim 7, wherein the QoS parameters corresponding to the QFI comprises QoS parameters between the relay terminal device and a network device.

9. The relay terminal device according to claim 7, wherein the core network comprises a first core network device, the first core network device provides control plane functions, and the parameter configuration information is carried in a control plane message exchanged between the first core network device and the relay terminal device.

10. The relay terminal device according to claim 9, wherein the configuration corresponding to the PCC rule comprises a PDU session corresponding to the PCC rule.

11. A core network device, comprising a processor, and a transceiver connected to the processor, wherein the transceiver is configured to send parameter configuration information to a relay terminal device; and the parameter configuration information is used for configuring Quality of Service QoS parameters between the relay terminal device and a remote terminal device when a reflective QOS mechanism is enabled, wherein the parameter configuration information comprises a QoS flow identifier QFI bound to a Policy and Charging Control PCC rule, and QoS parameters corresponding to the QFI;

the core network comprises a first core network device and a third core network device, the first core network device and the third core network device providing control plane functions; and the transceiver is configured to:

send, by the third core network device, the PCC rule to the first core network device, wherein the PCC rule comprises first reflective indication information, and the first reflective indication information is used to indicate whether to enable the reflective QoS mechanism;

determine, by the first core network device, a state of a configuration corresponding to the PCC rule; and send, by the first core network device, the parameter configuration information to the relay terminal device, when the first reflective indication information is used to enable the reflective QoS mechanism, and the configuration corresponding to the PCC rule is used for relaying.

12. The core network device according to claim 11, wherein the QoS parameters corresponding to the QFI comprises QoS parameters between the relay terminal device and a network device.

13. The core network device according to claim 11, wherein the core network comprises a first core network device, the first core network device provides control plane functions, and the parameter configuration information is carried in a control plane message exchanged between the first core network device and the relay terminal device.

14. The core network device according to claim 11, wherein the configuration corresponding to the PCC rule comprises a PDU session corresponding to the PCC rule.

* * * * *